US012807766B2

(12) United States Patent
Tang et al.

(10) Patent No.: US 12,807,766 B2
(45) Date of Patent: Nov. 24, 2026

(54) METHOD FOR MAKING HEVL-FILTERING CONTACT LENSES

(71) Applicant: Alcon Inc., Fribourg (CH)

(72) Inventors: Houliang Tang, Cumming, GA (US); Adam K. Sniady, Lilburn, GA (US); Frank Chang, Cumming, GA (US); Troy Vernon Holland, Suwanee, GA (US)

(73) Assignee: Alcon Inc., Fribourg (CH)

( * ) Notice: Subject to any disclaimer, the term of this patent is extended or adjusted under 35 U.S.C. 154(b) by 699 days.

(21) Appl. No.: 18/321,416

(22) Filed: May 22, 2023

(65) Prior Publication Data

US 2023/0374225 A1 Nov. 23, 2023

Related U.S. Application Data

(60) Provisional application No. 63/344,759, filed on May 23, 2022.

(51) Int. Cl.
*C08G 77/452* (2006.01)

(52) U.S. Cl.
CPC .................................. *C08G 77/452* (2013.01)

(58) Field of Classification Search
CPC .................................................... C08G 77/452
USPC .......................................................... 523/107
See application file for complete search history.

(56) References Cited

U.S. PATENT DOCUMENTS 4,136,250 A 1/1979 Mueller et al.
4,153,641 A 5/1979 Deichert et al.
4,182,822 A 1/1980 Chang
4,189,546 A 2/1980 Deichert et al.
4,254,248 A 3/1981 Friends et al.
4,259,467 A 3/1981 Keogh et al.
4,260,725 A 4/1981 Keogh et al.
4,261,875 A 4/1981 LeBoeuf
4,276,402 A 6/1981 Chromecek
4,327,203 A 4/1982 Deichert et al.
4,341,889 A 7/1982 Deichert et al.
4,343,927 A 8/1982 Chang
4,355,147 A 10/1982 Deichert et al.
(Continued)

FOREIGN PATENT DOCUMENTS

CN 110551247 B 1/2022

OTHER PUBLICATIONS

A. A. Gridnev, et al., Introduction of free radicals into the macrocyclic ring of porphyrins during polymerization of vinylpyrrolidone, Institute of Physical-Technical Problems, (pp. 670-675) Moscow. Translated from Teoreticheskaya i Eksperimantal'naya Khimiya, vol. 25, No. 6, pp. 727-732, Nov.-Dec. 1989.
(Continued)

*Primary Examiner* — David T Karst
(74) *Attorney, Agent, or Firm* — Jian Zhou

(57) ABSTRACT

Described herein is a method for producing HEVL-filtering contact lenses in a relatively efficient and consistent manner from a polymerizable composition under a controlled thermal curing scheme. The polymerizable composition comprises at least one N-vinyl amide monomer and at least one Cu(II)-meso-aryl-substituted porphyrin free of any ethylenically unsaturated group. The resultant HEVL-filtering contact lenses each comprise a polymer matrix to which the Cu(II)-meso-aryl-substituted porphyrin is grafted or covalently attached.

13 Claims, 2 Drawing Sheets

(56) References Cited

U.S. PATENT DOCUMENTS

| | | | |
|---|---|---|---|
| 4,444,711 | A | 4/1984 | Schad |
| 4,460,534 | A | 7/1984 | Boehm et al. |
| 4,486,577 | A | 12/1984 | Mueller et al. |
| 4,528,311 | A | 7/1985 | Beard |
| 4,543,398 | A | 9/1985 | Bany et al. |
| 4,605,712 | A | 8/1986 | Mueller et al. |
| 4,612,358 | A | 9/1986 | Besecke |
| 4,661,575 | A | 4/1987 | Tom |
| 4,684,538 | A | 8/1987 | Klemarczyk |
| 4,703,097 | A | 10/1987 | Wingler et al. |
| 4,716,234 | A | 12/1987 | Dunks |
| 4,833,218 | A | 5/1989 | Lee |
| 4,837,289 | A | 6/1989 | Mueller et al. |
| 4,929,693 | A | 5/1990 | Akashi |
| 4,954,586 | A | 9/1990 | Toyoshim et al. |
| 4,954,587 | A | 9/1990 | Mueller |
| 5,010,141 | A | 4/1991 | Mueller |
| 5,034,461 | A | 7/1991 | Lai et al. |
| 5,039,761 | A | 8/1991 | Ono et al. |
| 5,070,170 | A | 12/1991 | Robertson et al. |
| 5,070,215 | A | 12/1991 | Bambury et al. |
| 5,079,319 | A | 1/1992 | Mueller |
| 5,166,345 | A | 11/1992 | Akashi et al. |
| 5,346,946 | A | 9/1994 | Yokoyama et al. |
| 5,358,995 | A | 10/1994 | Lai et al. |
| 5,387,632 | A | 2/1995 | Lai et al. |
| 5,416,132 | A | 5/1995 | Yokoyama et al. |
| 5,449,729 | A | 9/1995 | Lai |
| 5,451,617 | A | 9/1995 | Lai et al. |
| 5,486,579 | A | 1/1996 | Lai et al. |
| 5,760,100 | A | 6/1998 | Nicolson et al. |
| 5,843,446 | A | 12/1998 | Ladd et al. |
| 5,894,002 | A | 4/1999 | Boneberger et al. |
| 5,962,548 | A | 10/1999 | Vanderlaan et al. |
| 5,981,675 | A | 11/1999 | Valint, Jr. et al. |
| 6,017,121 | A | 1/2000 | Chateau et al. |
| 6,019,914 | A | 2/2000 | Lokshin et al. |
| 6,039,913 | A | 3/2000 | Hirt et al. |
| 6,107,480 | A | 8/2000 | Funken et al. |
| 6,113,814 | A | 9/2000 | Gemert et al. |
| 6,149,841 | A | 11/2000 | Kumar |
| 6,166,236 | A | 12/2000 | Bambury et al. |
| 6,296,785 | B1 | 10/2001 | Nelson et al. |
| 6,348,604 | B1 | 2/2002 | Nelson et al. |
| 6,367,929 | B1 | 4/2002 | Maiden et al. |
| 6,719,929 | B2 | 4/2004 | Winterton et al. |
| 6,762,264 | B2 | 7/2004 | Kunzler et al. |
| 6,822,016 | B2 | 11/2004 | McCabe et al. |
| 6,867,245 | B2 | 3/2005 | Iwata et al. |
| 6,955,430 | B2 | 10/2005 | Pratt |
| 7,214,809 | B2 | 5/2007 | Zanini et al. |
| 7,423,074 | B2 | 9/2008 | Lai et al. |
| 7,556,376 | B2 | 7/2009 | Ishak |
| 7,556,750 | B2 | 7/2009 | Xiao et al. |
| 7,584,630 | B2 | 9/2009 | Van Gemert |
| 7,803,359 | B1 | 9/2010 | Jinkerson |
| 7,858,000 | B2 | 12/2010 | Winterton |
| 7,999,989 | B2 | 8/2011 | Asai et al. |
| 8,147,897 | B2 | 4/2012 | Ferreiro et al. |
| 8,153,703 | B2 | 4/2012 | Laredo |
| 8,158,037 | B2 | 4/2012 | Chopra et al. |
| 8,163,206 | B2 | 4/2012 | Chang |
| 8,232,326 | B2 | 7/2012 | Laredo |
| 8,360,574 | B2 | 1/2013 | Ishak |
| 8,409,599 | B2 | 4/2013 | Wu et al. |
| 8,415,405 | B2 | 4/2013 | Maggio et al. |
| 8,475,529 | B2 | 7/2013 | Clarke |
| 8,480,227 | B2 | 7/2013 | Qiu et al. |
| 8,529,057 | B2 | 9/2013 | Qiu et al. |
| 8,557,334 | B2 | 10/2013 | Samuel et al. |
| 8,585,938 | B1 | 11/2013 | Jinkerson |
| 8,614,261 | B2 | 12/2013 | Iwata et al. |
| 8,658,748 | B2 | 2/2014 | Liu |
| 8,697,770 | B2 | 4/2014 | Duis et al. |
| 8,741,188 | B2 | 6/2014 | Chopra et al. |
| 8,835,525 | B2 | 9/2014 | Kuyu et al. |
| 8,882,267 | B2 | 11/2014 | Ishak |
| 8,993,651 | B2 | 3/2015 | Chang et al. |
| 9,052,438 | B2 | 6/2015 | Xiao et al. |
| 9,097,840 | B2 | 8/2015 | Chang |
| 9,097,916 | B2 | 8/2015 | Chopra et al. |
| 9,103,965 | B2 | 8/2015 | Chang |
| 9,187,601 | B2 | 11/2015 | Huang |
| 9,217,813 | B2 | 12/2015 | Liu et al. |
| 9,315,669 | B2 | 4/2016 | Holland |
| 9,377,569 | B2 | 6/2016 | Ishak et al. |
| 9,465,234 | B2 | 10/2016 | Chopra |
| 9,475,827 | B2 | 10/2016 | Chang |
| 9,505,184 | B2 | 11/2016 | Kolluru |
| 9,683,102 | B2 | 6/2017 | Cefalo et al. |
| 9,814,658 | B2 | 11/2017 | Ishak et al. |
| 9,904,074 | B2 | 2/2018 | Duis |
| 10,081,697 | B2 | 9/2018 | Huang |
| 10,197,707 | B2 | 2/2019 | Xiao |
| 10,301,451 | B2 | 5/2019 | Jing |
| 10,465,047 | B2 | 11/2019 | Jing |
| 10,551,637 | B2 | 2/2020 | Ishak et al. |
| 10,610,472 | B2 | 4/2020 | Ishak et al. |
| 2017/0235034 | A1 | 8/2017 | Cefalo et al. |
| 2017/0242274 | A1 | 8/2017 | Holland |
| 2018/0371139 | A1 | 12/2018 | Mahadevan et al. |
| 2019/0002415 | A1 | 1/2019 | Mahadevan et al. |
| 2019/0002459 | A1 | 1/2019 | Mahadevan et al. |
| 2019/0271798 | A1 | 9/2019 | Mahadevan et al. |
| 2019/0339544 | A1 | 11/2019 | Dibella, Jr. et al. |
| 2020/0002267 | A1 | 1/2020 | Maharvi et al. |
| 2020/0095187 | A1 | 3/2020 | Arnold et al. |
| 2020/0407324 | A1 | 12/2020 | Mahadevan et al. |
| 2020/0407337 | A1 | 12/2020 | Mahadevan |
| 2021/0181379 | A1 | 6/2021 | Zheng et al. |

OTHER PUBLICATIONS

Jilin Zhou, MD, et al., Light Filtering in an RPE Culture Model, Optom Vis Sci., vol. 88 No. 6: pp. 1-12, Jun. 2011.

Mainster et al., How Much Blue Light should an IOL Transmit?, British J. of Ophthalmology, vol. 87, pp. 1523-1529, 2003.

Makoto Obata et al., RAFT Synthesis of an Amphiphilic Block Copolymer Bearing Chlorin Rings in the Hydrophobic Segment and Its Application in Photodynamic Therapy, Journal of Polymer Science, Part A: Polymer Chemistry, vol. 55, pp. 3395-3403, 2017.

Makoto Obata, et al., Porphyrin Derivatives Act as Vinylene Monomers in TEMPO-Mediated Radical Copolymerization with Styrene, Journal of Polymer Science Part A: Polymer Chemistry, vol. 50, pp. 3592-3597, 2012.

Raymond Bonnett, et al., Photobleaching of sensitisers used in photodynamic therapy, Tetrahedron, pp. 9513-9547, 2001.

SM Downes, Ultraviolet or blue-filtering intraocular lenses: what is the evidence?, Eye (2016) 30, pp. 215-221.

METHOD FOR MAKING HEVL-FILTERING CONTACT LENSES

This application claims the benefit under 35 USC § 119 (e) of U.S. provisional application No. 63/344,759 filed on 23 May 2022, incorporated by references in its entirety.

This invention is related to a method for producing contact lenses capable of filtering high-energy visible light (HEVL) with wavelengths from 380 nm to 450 nm, in particular, preferably silicone hydrogel contact lenses with HEVL-filtering capability. This invention also provides contact lenses or more preferably silicone hydrogel contact lenses with HEVL-filtering capability made according to a method of the invention.

BACKGROUND

Various HEVL-absorbing dyes (or compounds) have been developed for making ophthalmic lenses, such as, spectacles, contact lenses, intraocular lenses, etc. to protect eyes from increasing exposures of HEVL due to widely use of LED lights and LED displays, e.g., smart phone, TV and computer monitor (see, e.g., U.S. Pat. Nos. 4,612,358, 4,528,311, 4,716,234, 7,556,376, 7,803,359, 8,153,703, 8,232,326, 8,360,574, 8,585,938, 8,882,267, 9,377,569, 9,683,102, 9,814,658, 10,551,637, and 10,610,472; U.S. Pat. Appl. Pub. Nos. 20170242274, 20180371139, 20190002415, 20190002459, 20190271798, 20190339544, 20200002267, 20200095187, 20200407324, and 20200407337). TOTAL30® contact lenses (from Alcon) not only include Class I UV absorption for protection against UVA and UVB rays (i.e., filtering more than 90% of UVA and 99% of UVB rays), but also can filter out approximately 34% of HEVL rays entering the eye (between 380-450 nm). TOTAL30® is the first contact lens to offer HEVL-filtering capability that is constantly in effect while wearing the lenses regardless of the lighting conditions.

One challenge in incorporating a HEVL-absorbing dye into contact lenses is to covalently attach the HEVL-absorbing dye to the polymer matrix of the contact lenses in order to prevent the HEVL-absorbing dye from leaching out of the contact lenses during wear. Typically, HEVL-absorbing molecules need to be chemically modified to introduce ethylenically-unsaturated groups into the HEVL-absorbing molecules. Such a chemical modification may require a complicated synthesis route and a tedious purification process.

Therefore, there is still a need for a process for producing HEVL-filtering contact lenses, in particular, HEVL-filtering silicone hydrogel contact lenses.

SUMMARY OF THE INVENTION

The invention provides a method for producing HEVL-filtering contact lenses, the method comprising the steps of:

(1) providing a mold for making a contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces;

(2) introducing a polymerizable composition into the cavity, wherein the polymerizable composition comprises (a) at least one Cu(II)-meso-aryl-substituted porphyrin, (b) from about 20% to about 70% by weight of at least one hydrophilic vinylic monomer, wherein said at least one hydrophilic vinylic monomer comprises at least one hydrophilic N-vinyl amide monomer that is present in an amount in the polymerizable composition sufficient for ensuring said at least one Cu(II)-meso-aryl-substituted porphyrin to be grafted a polymer matrix formed from the polymerizable composition, (c) at least one siloxane-containing vinylic monomer, (d) at least one polysiloxane vinylic crosslinker and/or at least one non-silicone vinylic crosslinker, (e) from 0 to about 15% by weight of at least one hydrophobic non-silicone vinylic monomer, and (f) at least one thermal free radical initiator, wherein the sum of the amounts of components (a) to (f) is at least 95% by weight relative to total amount of all polymerizable components in the polymerizable composition;

(3) curing thermally the polymerizable composition in the mold in an oven to form a lens precursor that comprises the polymer matrix having Cu(II)-meso-aryl-substituted porphyrin grafted thereto; and (4) subjecting the lens precursor to one or more post-molding processes selected from the group consisting of extraction, surface treatment, hydration, packaging, sterilization, and combinations thereof, to form a HEVL-filtering contact lens capable of filtering HEVL.

The invention provides in another aspect HEVL-filtering contact lenses obtained according to a method of the invention.

BRIEF DESCRIPTIONS OF THE DRAWINGS

FIG. 1 shows the UV/visible transmission spectra of: 1 (dash line)—a lens-forming composition comprising N,N-dimethylacrylamide and 5,10,15,20-tetrakis(2,6-dichlorophenyl)-porphyrin-Cu(II); 2 (dot line)—a hydrated contact lens obtained from the lens-forming composition without being subjected to extraction; and 3 (solid line)—a hydrated contact lens obtained from the lens-forming composition after being subjected to extraction.

FIG. 2 shows UV/visible transmission spectra of: 1 (dash line)—a lens-forming composition comprising N-vinylpyrrolidone and 5,10,15,20-tetrakis(2,6-dichlorophenyl)-porphyrin-Cu(II); 2 (dot line)—a hydrated contact lens obtained from the lens-forming composition without being subjected to extraction; and 3 (solid line)—a hydrated contact lens obtained from the lens-forming composition after being subjected to extraction, according to a preferred embodiment of the invention.

DETAILED DESCRIPTION

Figure 1:
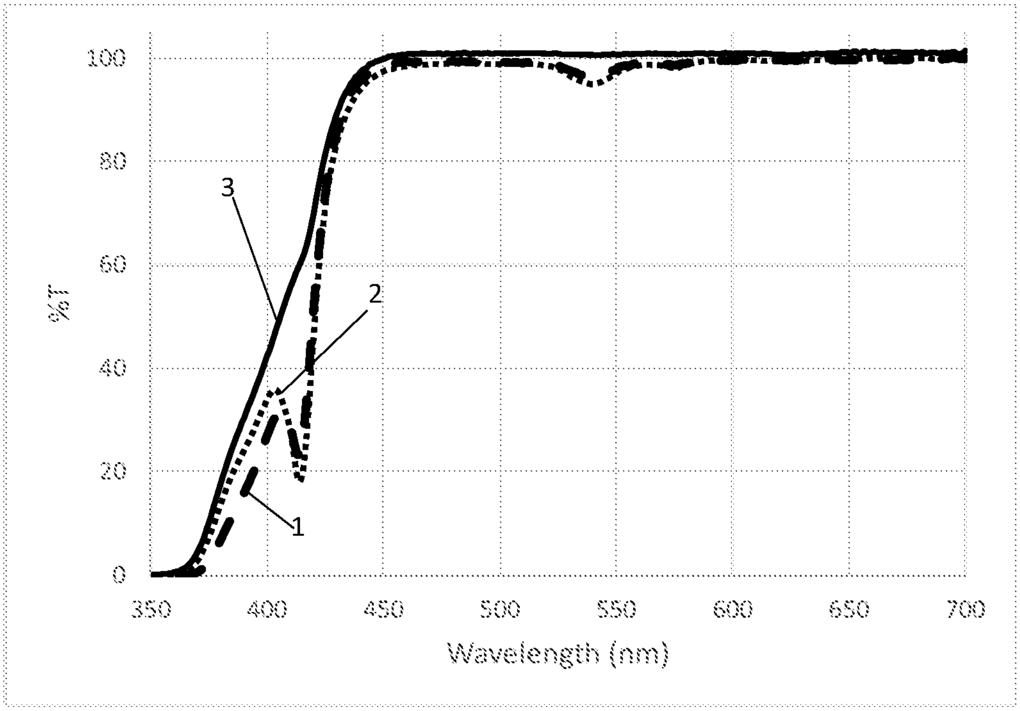

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"About" as used herein means that a number referred to as "about" comprises the recited number plus or minus 1-10% of that recited number.

"Optional" or "optionally" means that the subsequently described event or circumstance can or cannot occur, and that the description includes instances where the event or circumstance occurs and instances where it does not.

An "ophthalmic device", as used herein, refers to a contact lens (hard or soft), an intraocular lens, a corneal onlay, other ophthalmic devices (e.g., stents, glaucoma shunt, or the like) used on or about the eye or ocular vicinity.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens.

A "hydrogel contact lens" refers to a contact lens comprising a hydrogel bulk (core) material. A hydrogel bulk material can be a non-silicone hydrogel material or preferably a silicone hydrogel material.

A "hydrogel" or "hydrogel material" refers to a crosslinked polymeric material which has three-dimensional polymer networks (i.e., polymer matrix), is insoluble in water, but can hold at least 10% by weight of water in its polymer matrix when it is fully hydrated (or equilibrated).

A siloxane, which often also described as a silicone, refers to a molecule having at least one moiety of —Si—O—Si— where each Si atom carries two organic groups as substituents.

A "silicone hydrogel" or "SiHy" refers to a silicone-containing hydrogel obtained by copolymerization of a polymerizable composition comprising at least one silicone-containing monomer or at least one silicone-containing macromer or at least one crosslinkable silicone-containing prepolymer.

As used in this application, the term "non-silicone hydrogel" refers to a hydrogel that is theoretically free of silicon.

"Hydrophilic," as used herein, describes a material or portion thereof that will more readily associate with water than with lipids.

The term "room temperature" refers to a temperature of about 22 °C to about 26 °C.

The term "soluble", in reference to a compound or material in a solvent, means that the compound or material can be dissolved in the solvent to give a solution with a concentration of at least about 0.5% by weight at room temperature (i.e., from about 22 °C to about 26 °C).

The term "insoluble", in reference to a compound or material in a solvent, means that the compound or material can be dissolved in the solvent to give a solution with a concentration of less than 0.01% by weight at room temperature (as defined above).

A "vinylic monomer" refers to a compound that has one sole ethylenically unsaturated group, is soluble in a solvent, and can be polymerized actinically or thermally.

The term "ethylenically unsaturated group" is employed herein in a broad sense and is intended to encompass any groups containing at least one >C═$CH_2$ group. Exemplary ethylenically unsaturated groups include without limitation (meth)acryloyl

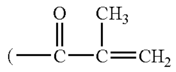 and/or 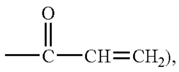

vinyloxycarbonylamino

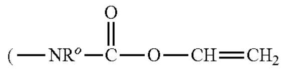

in which $R^o$ is H or $C_1$-$C_4$ alkyl), vinyloxycarbonyloxy

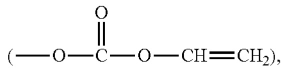

allyl, vinyl, styrenyl, or other C═C containing groups.

As used herein, "actinically" in reference to curing, crosslinking or polymerizing of a polymerizable composition, a prepolymer or a material means that the curing (e.g., crosslinked and/or polymerized) is performed by actinic irradiation, e.g., UV/visible light irradiation, or the like. Thermal curing or actinic curing methods are well-known to a person skilled in the art.

An "acrylic monomer" refers to a vinylic monomer having one sole (meth)acryloyl group. Examples of acrylic monomers includes (meth)acryloxy [or (meth)acryloyloxy] monomers and (meth)acrylamido monomers.

An "(meth)acryloxy monomer" or "(meth)acryloyloxy monomer" refers to a vinylic monomer having one sole group of

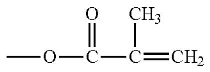 or 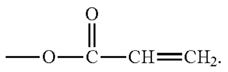

An "(meth)acrylamido monomer" refers to a vinylic monomer having one sole group of

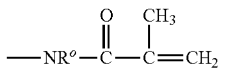 or 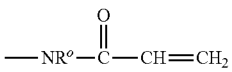

in which $R^o$ is H or $C_1$-$C_4$ alkyl.

The term "(meth)acrylamide" refers to methacrylamide and/or acrylamide.

The term "(meth)acrylate" refers to methacrylate and/or acrylate.

An "N-vinyl amide monomer" refers to an amide compound having a vinyl group (—CH═$CH_2$) that is directly attached to the nitrogen atom of the amide group.

The term "ene group" refers to a monovalent radical of $CH_2$═CH— or $CH_2$═$CCH_3$— that is not covalently attached to an oxygen or nitrogen atom or a carbonyl group.

An "ene monomer" refers to a vinylic monomer having one sole ene group.

A "vinyloxycarbonylamino monomer" refers to a vinylic monomer having one sole vinyloxycarbonylamino group.

A "vinylaminocarbonyloxy monomer" refers to a vinylic monomer having one sole vinylaminocarbonyloxy group.

A "vinylaminocarbonylamino monomer" refers to a vinylic monomer having one sole vinylaminocarbonylamino group.

A "hydrophilic vinylic monomer" refers to a vinylic monomer which typically yields a homopolymer that is water-soluble or can absorb at least 10 percent by weight of water.

A "hydrophobic vinylic monomer" refers to a vinylic monomer which typically yields a homopolymer that is insoluble in water and can absorb less than 10% by weight of water.

As used in this application, the term "vinylic crosslinker" refers to an organic compound having at least two ethylenically unsaturated groups. A "vinylic crosslinking agent" refers to a vinylic crosslinker having a molecular weight of 700 Daltons or less.

An "acrylic crosslinker" refers to a vinylic crosslinker having at least two (meth)acryloyl groups.

The term "acrylic repeating units" refers to repeating units of a polymeric material, each of which is derived from an acrylic monomer or crosslinker in a free-radical polymerization to form the polymeric material.

The term "terminal (meth)acryloyl group" refers to one (meth)acryloyl group at one of the two ends of the main chain (or backbone) of an organic compound as known to a person skilled in the art.

As used in this application, the term "polymer" means a material formed by polymerizing or crosslinking one or more monomers or macromers or prepolymers or combinations thereof.

A "macromer" or "prepolymer" refers to a compound or polymer that has ethylenically unsaturated groups and has a number average molecular weight of greater than 700 Daltons.

As used in this application, the term "molecular weight" of a polymeric material (including monomeric or macromeric materials) refers to the number-average molecular weight unless otherwise specifically noted or unless testing conditions indicate otherwise. A skilled person knows how to determine the molecular weight of a polymer according to known methods, e.g., GPC (gel permeation chromatography) with one or more of a refractive index detector, a low-angle laser light scattering detector, a multi-angle laser light scattering detector, a differential viscometry detector, a UV detector, and an infrared (IR) detector; MALDI-TOF MS (matrix-assisted laser desorption/ionization time-of-flight mass spectroscopy); 1H NMR (Proton nuclear magnetic resonance) spectroscopy, etc.

A "polysiloxane segment" or "polydiorganosiloxane segment" interchangeably refers to a polymer chain segment (i.e., a divalent radical) of

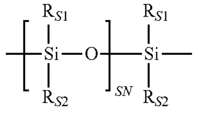

in which SN is an integer of 3 or larger and each of $R_{S1}$ and $R_{S2}$ independent of one another are selected from the group consisting of: $C_1$-$C_{10}$ alkyl; phenyl; $C_1$-$C_4$-alkyl-substituted phenyl; $C_1$-$C_4$-alkoxy-substituted phenyl; phenyl-$C_1$-$C_6$-alkyl; $C_1$-$C_{10}$ fluoroalkyl; $C_1$-$C_{10}$ fluoroether; aryl; aryl $C_1$-$C_{18}$ alkyl; -alk-$(OC_2H_4)_{\gamma 1}$—$OR^o$ (in which alk is $C_1$-$C_6$ alkylene diradical, $R^o$ is H or $C_1$-$C_4$ alkyl and γ1 is an integer from 1 to 10); a $C_2$-$C_{40}$ organic radical having at least one functional group selected from the group consisting of hydroxyl group (—OH), carboxyl group (—COOH), amino group (—$NR_{N1}R_{N1}'$), amino linkages of —$NR_{N1}$—, amide linkages of —$CONR_{N1}$—, amide of —$CONR_{N1}R_{N1}'$, urethane linkages of —OCONH—, and $C_1$-$C_4$ alkoxy group, or a linear hydrophilic polymer chain, in which $R_{N1}$ and $R_{N1}'$ independent of each other are hydrogen or a $C_1$-$C_{15}$ alkyl; and a photochromic organic radical having a photochromic group.

A "polydiorganosiloxane vinylic monomer" or "polysiloxane vinylic monomer" interchangeably refers to a compound comprising at least one polysiloxane segment and one sole ethylenically-unsaturated groups.

A "polydiorganosiloxane vinylic crosslinker" or "polysiloxane vinylic crosslinker" interchangeably refers to a compound comprising at least one polysiloxane segment and at least two ethylenically-unsaturated groups.

A "linear polydiorganosiloxane vinylic crosslinker" or "linear polysiloxane vinylic crosslinker" interchangeably refers to a compound comprising a main chain which includes at least one polysiloxane segment and is terminated with one ethylenically-unsaturated group at each of the two ends of the main chain.

A "chain-extended polydiorganosiloxane vinylic crosslinker" or "chain-extended polysiloxane vinylic crosslinker" interchangeably refers to a compound comprising at least two ethylenically-unsaturated groups and at least two polysiloxane segments each pair of which are linked by one divalent radical.

The term "photochromic compound" refers to a compound that has one colorless (or light-colored) form and one colored form and can undergo reversible change from the colorless form (or light-colored form) (or so-called "deactivated form") to the colored form (or so-called "activated form") upon exposure to UV or HEVL irradiation.

The term "colorless or light-colored stated" or "inactivated state" in reference to a photochromic contact lens means the original state of the photochromic contact lens before the photochromic contact lens is irradiated with UV and/or HEVL. In this state, the photochromic contact lens typically is colorless or shows a faint color as observed by a naked eye.

The term "colored stated" or "activated state" in reference to a photochromic contact lens means a state of the photochromic contact lens when the photochromic contact lens is being irradiated with UV and/or HEVL. In this state, the photochromic contact lens typically shows a dark color as observed by a naked eye.

The term "fluid" as used herein indicates that a material is capable of flowing like a liquid.

As used in this application, the term "clear" in reference to a polymerizable composition means that the polymerizable composition is a transparent solution or liquid mixture having a light transmissibility of 85% or greater (preferably 90% or greater) in the range between 400 to 700 nm.

A free radical initiator can be either a photoinitiator or a thermal initiator. A "thermal initiator" or "thermal free radical initiator" interchangeably refers to a chemical that initiates free radical crosslinking/polymerizing reaction by the use of heat energy. A "photoinitiator" refers to a chemical that initiates free radical crosslinking/polymerizing reaction by the use of light.

The term "monovalent radical" refers to an organic radical that is obtained by removing a hydrogen atom from an organic compound and that forms one bond with one other group in an organic compound. Examples include without limitation, alkyl (by removal of a hydrogen atom from an alkane), alkoxy (or alkoxyl) (by removal of one hydrogen atom from the hydroxyl group of an alkyl alcohol), thiyl (by removal of one hydrogen atom from the thiol group of an alkylthiol), cycloalkyl (by removal of a hydrogen atom from a cycloalkane), cycloheteroalkyl (by removal of a hydrogen atom from a cycloheteroalkane), aryl (by removal of a hydrogen atom from an aromatic ring of the aromatic hydrocarbon), heteroaryl (by removal of a hydrogen atom from any ring atom), amino (by removal of one hydrogel atom from an amine), etc.

The term "divalent radical" refers to an organic radical that is obtained by removing two hydrogen atoms from an organic compound and that forms two bonds with other two groups in an organic compound. For example, an alkylene divalent radical (i.e., alkylenyl) is obtained by removal of two hydrogen atoms from an alkane, a cycloalkylene divalent radical (i.e., cycloalkylenyl) is obtained by removal of two hydrogen atoms from the cyclic ring.

In this application, the term "substituted" in reference to an alkyl or an alkylenyl means that the alkyl or the alkylenyl comprises at least one substituent which replaces one hydrogen atom of the alkyl or the alkylenyl and is selected from the group consisting of hydroxyl (—OH), carboxyl (—COOH), —$NH_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, and combinations thereof.

"Post-curing surface treatment", in reference to a SiHy lens bulk material or a SiHy contact lens, means a surface treatment process that is performed after the SiHy lens bulk material or the SiHy contact lens is formed by curing (i.e., thermally or actinically polymerizing) a SiHy lens formulation.

The term "silicone hydrogel lens formulation" or "SiHy lens formulation" interchangeably refers to a polymerizable composition that comprises all necessary polymerizable components for producing a SiHy contact lens or a SiHy lens bulk material.

A "polymerizable UV-absorbing compound" refers to a compound comprising an ethylenically-unsaturated group and a UV-absorbing moiety which can absorb or screen out UV radiation in the range from 200 nm to 380 nm as understood by a person skilled in the art.

A "polymerizable HEVL-absorbing compound" refers to a compound comprising an ethylenically-unsaturated group and a HEVL-absorbing moiety which can absorb or screen out HEVL (high-energy visible light in the range from 380 nm to 450 nm) as understood by a person skilled in the art.

"UVA" refers to radiation occurring at wavelengths between 315 and 380 nanometers; "UVB" refers to radiation occurring between 280 and 315 nanometers; "HEVL" refers to radiation occurring at wavelengths between 380 and 450 nanometers.

"UVA transmittance" (or "UVA % T"), "UVB transmittance" or "UVB % T", and "HEVL-transmittance" or "HEVL % T" are calculated by the following formula.

UVA % T=Average % Transmission between 315 nm and 380 nm×100

UVB % T=Average % Transmission between 280 nm and 315 nm×100

HEVL % T=Average % Transmission between 380 nm and 450 nm×100

The "oxygen permeability", $Dk_i$, of a material is the rate at which oxygen will pass through a material and can be measured at about 34-35 °C according to the procedures described in Example 1. Oxygen permeability is conventionally expressed in units of barrers, where "barrer" is defined as $[(cm^3 \text{ oxygen})(mm)/(cm^2)(sec)(mm\ Hg)]\times10^{-10}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as $[(cm^3 \text{ oxygen})/(cm^2)(sec)(mm\ Hg)]\times10^{-9}$.

The term "modulus" or "elastic modulus" in reference to a contact lens or a material means the tensile modulus or Young's modulus which is a measure of the stiffness of a contact lens or a material. The modulus can be measured according to the procedures described in Example 1.

A "coating" in reference to a contact lens means that the contact lens has, on its surfaces, a thin layer of a material that is different from the bulk material of the contact lens and obtained by subjecting the contact lens to a surface treatment.

"Surface modification" or "surface treatment", as used herein, means that an article has been treated in a surface treatment process, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified. Exemplary surface treatment processes include, but are not limited to, a surface treatment by energy (e.g., a plasma, a static electrical charge, irradiation, or other energy source), chemical treatments, the grafting of hydrophilic vinylic monomers or macromers onto the surface of an article, mold-transfer coating process disclosed in U.S. Pat. No. 6,719,929, the incorporation of wetting agents into a lens formulation for making contact lenses proposed in U.S. Pat. Nos. 6,367,929 and 6,822,016, reinforced mold-transfer coating disclosed in U.S. Pat. No. 7,858,000, and a hydrophilic coating composed of covalent attachment or physical deposition of one or more layers of one or more hydrophilic polymer onto the surface of a contact lens disclosed in U.S. Pat. Nos. 8,147,897, 8,409,599, 8,557,334, 8,529,057, and 9,505,184.

A "hydrophilic surface" in reference to a SiHy material or a contact lens means that the SiHy material or the contact lens has a surface hydrophilicity characterized by having an averaged water contact angle of about 90 degrees or less, preferably about 80 degrees or less, more preferably about 70 degrees or less, more preferably about 60 degrees or less.

An "average contact angle" refers to a water contact angle (static water contact angle measured by Sessile Drop), which is obtained by averaging measurements of at least 3 individual contact lenses.

In this application, a "Cu(II)-meso-aryl-substituted porphyrin" refers to a copper-porphyrin which comprises 4 aryl groups (as substituents) at positions 5, 10, 15 and 20 (i.e., the so-called meso positions) of the porphyrin as known to a person skilled in the art.

In general, the invention is directed to a method for producing HEVL-filtering contact lenses, more particularly, HEVL-filtering SiHy contact lenses from a polymerizable composition comprising at least one N-vinyl amide monomer and at least one Cu(II)-meso-aryl-substituted porphyrin free of ethylenically unsaturated group. The resultant HEVL-filtering contact lenses each comprise a polymer matrix to which the Cu(II)-meso-aryl-substituted porphyrin is grafted (covalently attached).

The present invention is partly based on the discovery that Cu(II)-meso-aryl-substituted porphyrin (e.g., 5,10,15,20-tetrakis-(2,6-dichlorophenyl)-porphyrin-Cu(II)) can participate in the free radical polymerization of a polymerizable composition comprising a sufficient amount of at least one N-vinyl amide monomer (e.g., N-vinylpyrrolidone), even though such a Cu(II)-meso-aryl-substituted porphyrin is free of any ethylenically unsaturated group. It is also discovered that the properties of the resultant polymeric materials are not adversely and significantly affected by the participation of the Cu(II)-meso-aryl-substituted porphyrin in the free radical polymerization. Resultant polymeric materials with Cu(II)-meso-aryl-substituted porphyrin grafted thereonto still exhibit HEVL-filtering (i.e., HEVL-absorbing) property substantially similar to that of the starting Cu(II)-meso-aryl-substituted porphyrin, indicating no significant decomposition or no damages to the aromatic π-electronic system of Cu(II)-meso-aryl-substituted porphyrin during the free radical polymerization. According to the present invention, there is no need for chemically modifying HEVL-absorbing compounds to introduce one or more ethylenically unsaturated groups.

The present invention provides a method for producing HEVL-filtering contact lenses, the method comprising the steps of:

(1) providing a mold for making a contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces;

(2) introducing a polymerizable composition into the cavity, wherein the polymerizable composition comprises (a) at least one Cu(II)-meso-aryl-substituted porphyrin, (b) from about 20% to about 70% by weight of at least one hydrophilic vinylic monomer, wherein said at least one hydrophilic vinylic monomer comprises at least one hydrophilic N-vinyl amide monomer that is present in an amount in the polymerizable composition sufficient for ensuring said at least one Cu(II)-meso-aryl-substituted porphyrin to be grafted a polymer matrix formed from the polymerizable composition, (c) at least one siloxane-containing vinylic monomer, (d) at least one polysiloxane vinylic crosslinker and/or at least one non-silicone vinylic crosslinker, (e) from 0 to about 15% by weight of at least one hydrophobic non-silicone vinylic monomer, and (f) at least one thermal free radical initiator, wherein the sum of the amounts of components (a) to (f) is at least 95% by weight relative to total amount of all polymerizable components in the polymerizable composition;

(3) curing thermally the polymerizable composition in the mold in an oven to form a lens precursor that comprises the polymer matrix having Cu(II)-meso-aryl-substituted porphyrin grafted thereto; and (4) subjecting the lens precursor to one or more post-molding processes selected from the group consisting of extraction, surface treatment, hydration, packaging, sterilization, and combinations thereof, to form a HEVL-filtering contact lens capable of filtering HEVL.

Lens molds for making contact lenses including SiHy contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens-forming cavity is formed between the first molding surface and the second molding surface. The molding surface of a mold half is the cavity-forming surface of the mold and in direct contact with the polymerizable composition.

The mold halves can be formed through various techniques, such as injection molding. Methods of manufacturing mold halves for cast-molding a contact lens are generally well known to those of ordinary skill in the art. The process of the present invention is not limited to any particular method of forming a mold. In fact, any method of forming a mold can be used in the present invention. The mold halves can be formed through various techniques, such as injection molding or lathing. Examples of suitable processes for forming the mold halves are disclosed in U.S. Pat. Nos. 4,444,711; 4,460,534; 5,843,446; and 5,894,002.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, New Jersey), or the like can be used. Other materials that allow UV light transmission could be used, such as quartz glass and sapphire.

In accordance with the invention, any Cu(II)-meso-aryl-substituted porphyrins can be used. Preferably, each of the four aryl groups of the Cu(II)-meso-aryl-substituted porphyrin is a substituted phenyl group which has at least two substituents located at 2- and 6-positions of the substituted phenyl group. More preferably, Cu(II)-meso-aryl-substituted porphyrin is represented by formula (P1)

(P1)

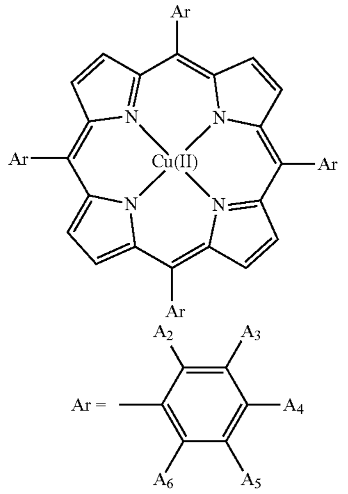

in which $A_2$ and $A_6$ independent of each other are Cl, F, $CCl_3$, $CF_3$, $CH_3$, $CH(CH_3)_2$, $C(CH_3)_3$, $OCH_3$, OH, or $NO_2$ (preferably Cl, F, or $NO_2$), $A_3$, $A_4$ and $A_5$ independent of one another are H, Cl, F, $CCl_3$, $CF_3$, $CH_3$, $CH(CH_3)_2$, $C(CH_3)_3$, $OCH_3$, OH, $NH_2$, or $NO_2$. In a preferred embodiment, $A_2$, $A_3$, $A_4$, $A_5$, and $A_6$ are identical to one other and are Cl or F. In another preferred embodiment, $A_2$ and $A_6$ independent of each other are Cl or F; $A_4$ and $A_5$ are H; and $A_3$ is Cl, F, $CCl_3$, $CF_3$, $CH_3$, $CH(CH_3)_2$, $C(CH_3)_3$, $OCH_3$, OH, $NH_2$, or $NO_2$. In another preferred embodiment, $A_2$ and $A_6$ independent of each other are Cl or F; $A_3$ and $A_5$ are H; and $A_4$ is Cl, F, $CCl_3$, $CF_3$, $CH_3$, $CH(CH_3)_2$, $C(CH_3)_3$, $OCH_3$, OH, $NH_2$, or $NO_2$.

Examples of preferred Cu(II)-meso-aryl-substituted porphyrins of formula (P1) include without limitation 5,10,15,20-tetrakis(2,6-dichlorophenyl)-porphyrin-Cu(II), 5,10,15,20-tetrakis(2,6-difluorophenyl)-porphyrin-Cu(II), 5, 10, 15,20-tetrakis(2-chloro-6-fluorophenyl)-porphyrin-Cu(II), 5,10,15,20-tetrakis(2,6-dinitrophenyl)-porphyrin-Cu(II), 5,10,15,20-tetrakis(2,3,6-trichloro-phenyl)-porphyrin-Cu (II), 5,10,15,20-tetrakis(2,3,6-trifluorophenyl)-porphyrin-Cu(II), 5,10,15,20-tetrakis(2,4,6-trinitrophenyl)-porphyrin-Cu(II), 5,10,15,20-tetrakis(2,4,6-trimethylphenyl)-porphyrin-Cu(II), 5,10,15,20-tetrakis(2,6-dichloro-3-aminophenyl)-porphyrin-Cu(II), 5,10,15,20-tetrakis(4-bromo-2,6-dichlorophenyl)-porphyrin-Cu(II), 5,10,15,20-tetrakis(2,6-dichloro-4-nitro-phenyl)-porphyrin-Cu(II), 5,10,15,20-tetrakis(2,6-dichloro-3-nitrophenyl)-porphyrin-Cu(II), 5,10,15,20-tetrakis(2,6-dihydroxyphenyl)-porphyrin-Cu(II), 5,10,15,20-tetrakis(2,6-dimethoxy-phenyl)-porphyrin-Cu(II), 5,10,15,20-tetrakis(pentachlorophenyl)-porphyrin-Cu(II), 5,10,15,20-tetrakis(pentafluorophenyl)-porphyrin-Cu(II), 10,15,20-tris(2,6-dichlorophenyl)-5-(2,3,4,5,6-pentafluorophenyl)-porphyrin-Cu(II), 5,10,15-tris (pentafluorophenyl)-20-(2.6-dichlorophenyl)-porphyrin-Cu (II), and 10,20-bis(2,6-dichlorophenyl)-5,15-bis(2,3,4,5,6-pentafluorophenyl)-porphyrin-Cu(II).

In accordance with the invention, any suitable hydrophilic N-vinyl amide monomers can be used in the invention. Examples of preferred hydrophilic N-vinyl amide monomers include without limitation N-vinylpyrrolidone, N-vinyl piperidone, N-vinyl caprolactam, N-vinyl-N-methyl acetamide, N-vinyl formamide, N-vinyl acetamide, N-vinyl isopropylamide, N-vinyl-N-methyl acetamide, N-vinyl-N-ethyl acetamide, N-vinyl-N-ethyl formamide, and mixtures thereof. Preferably, the N-vinyl amide monomer is N-vinylpyrrolidone, N-vinyl-N-methyl acetamide, or combinations thereof.

In a preferred embodiment, the polymerizable composition comprises from about 15% to about 70% (preferably from about 20% to about 65%, more preferably from about 25% to about 65%, even more preferably from about 30% to about 65%, most preferably from about 35% to about 60%) by weight of at least one hydrophilic N-vinyl amide monomer relative to total amount of all polymerizable components in the polymerizable composition.

In accordance with the invention, any hydrophilic vinylic monomer other than hydrophilic N-vinyl amide monomer can be used in the invention. Examples of preferred hydrophilic vinylic monomers are hydrophilic (meth)acrylamido monomer (as described later in this application), hydrophilic (meth)acryloxy monomer (as described later in this application), methylene-containing pyrrolidone monomers (i.e., pyrrolidone derivatives each having a methylene group connected to the pyrrolidone ring at 3- or 5-position) (as described later in this application), vinyl ether monomers (as described later in this application), allyl ether monomers (as described later in this application), phosphorylcholine-containing vinylic monomers (as described later in this application), allyl alcohol, N-2-hydroxyethyl vinyl carbamate, N-vinyloxycarbonyl-β-alanine (VINAL), N-vinyloxycarbonyl-α-alanine, and combinations thereof.

Any siloxane-containing vinylic monomer can be used in the invention. Examples of preferred siloxane-containing vinylic monomers can be siloxane-containing (meth)acrylamido monomers, siloxane-containing (meth)acryloxy monomers, siloxane-containing vinyloxycarbonyloxy monomers, siloxane-containing vinyloxycarbonylamino monomers, siloxane-containing vinylaminocarbonylamino monomers, or siloxane-containing vinylaminocarbonyloxy monomers, each of which comprises a bis(trialkylsilyloxy) alkylsilyl group, a tris(trialkylsilyloxy)-silyl group, or a polysiloxane chain having 2 to 30 siloxane units and terminated with an alkyl, hydroxyalkyl or methoxyalkyl group. Such preferred siloxane-containing vinylic monomers can be obtained from the commercial suppliers, or alternatively prepared according to known procedures, e.g., similar to those described in U.S. Pat. Nos. 5,070,215, 6,166,236, 6,867,245, 7,214,809, 8,415,405, 8,475,529, 8,614,261, 8,658,748, 9,097,840, 9,103,965, 9,217,813, 9,315,669, and 9,475,827, or by reacting a vinylic monomer having a reactive functional group (e.g., an acid chloride, acid anhydride, carboxyl, hydroxyl, amino, epoxy, isocyanate, aziridine, azlactone, or aldehyde group) with a siloxane-containing compound having a reactive group selected from the group consisting of a hydroxyalkyl, an aminoalkyl, an alkylaminoalkyl, a carboxyalkyl, an isocyanatoalkyl, an epoxyalkyl, and an aziridinylalkyl, in the presence or absence of a coupling agent under coupling reaction conditions well known to a person skilled in the art.

In accordance with the invention, any polysiloxane vinylic crosslinkers can be used in this invention. Examples of preferred polysiloxane vinylic crosslinkers include without limitation α, ω-(meth)acryloxy-terminated polydimethylsiloxanes of various molecular weight; α,ω-(meth)acrylamido-terminated polydimethylsiloxanes of various molecular weight; α,ω-vinyl carbonate-terminated polydimethylsiloxanes of various molecular weight; α,ω-vinyl carbamate-terminated polydimethylsiloxane of various molecular weight; bis-3-methacryloxy-2-hydroxypropyloxypropyl polydimethylsiloxane of various molecular weight; N,N,N',N'-tetrakis(3-methacryloxy-2-hydroxypropyl)-alpha, omega-bis-3-aminopropyl-polydimethylsiloxane of various molecular weight; the reaction products of glycidyl methacrylate with amino-functional polydimethylsiloxanes; the reaction products of an azlactone-containing vinylic monomer (any one of those described above) with hydroxyl-functional polydimethylsiloxanes; polysiloxane-containing macromer selected from the group consisting of Macromer A, Macromer B, Macromer C, and Macromer D described in U.S. Pat. No. 5,760,100; polysiloxane vinylic crosslinkers disclosed in U.S. Pat. Nos. 4,136,250, 4,153,641, 4,182,822, 4,189,546, 4,259,467, 4,260,725, 4,261,875, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,449,729, 5,451,617, 5,486,579, 5,962,548, 5,981,675, 6,039,913, 6,762,264, 7,423,074, 8,163,206, 8,480,227, 8,529,057, 8,835,525, 8,993,651, 9,187,601, 10,081,697, 10,301,451, and 10,465,047.

One class of preferred polysiloxane vinylic crosslinkers are di-(meth)acryloyloxy-terminated polysiloxane vinylic crosslinkers each having dimethylsiloxane units and hydrophilized siloxane units each having one methyl substituent and one monovalent $C_4$-$C_{40}$ organic radical substituent having 2 to 6 hydroxyl groups, more preferably a polysiloxane vinylic crosslinker of formula (H), are described later in this application and can be prepared according to the procedures disclosed in U.S. patent Ser. No. 10/081,697.

Another class of preferred polysiloxane vinylic crosslinkers are vinylic crosslinkers each of which comprises one sole polysiloxane segment and two terminal (meth)acryloyl groups, which can be obtained from commercial suppliers; prepared by reacting glycidyl (meth)acrylate (meth)acryloyl chloride with a di-amino-terminated polydimethylsiloxane or a di-hydroxyl-terminated polydimethylsiloxane; prepared by reacting isocyantoethyl (meth)acrylate with di-hydroxyl-terminated polydimethylsiloxanes prepared by reacting an amino-containing acrylic monomer with di-carboxyl-terminated polydimethylsiloxane in the presence of a coupling agent (a carbodiimide); prepared by reacting a carboxyl-containing acrylic monomer with di-amino-terminated polydimethylsiloxane in the presence of a coupling agent (a carbodiimide); or prepared by reacting a hydroxyl-containing acrylic monomer with a dihydroxy-terminated polydisiloxane in the presence of a diisocyanate or diepoxy coupling agent.

Other classes of preferred polysiloxane vinylic crosslinkers are chain-extended polysiloxane vinylic crosslinkers each of which has at least two polysiloxane segments linked by a linker between each pair of polysiloxane segments and two terminal ethylenically unsaturated groups, which can be prepared according to the procedures described in U.S. Pat. Nos. 5,034,461, 5,416,132, 5,449,729, 5,760,100, 7,423,074, 8,529,057, 8,835,525, 8,993,651, 9,187,601, 10,301,451, and 10,465,047.

In accordance with the invention, any non-silicone vinylic crosslinkers can be in this 1 invention. Examples of preferred non-silicone vinylic cross-linking agents are described later in this application.

Any hydrophobic non-silicone vinylic monomers can be in this invention. Examples of preferred hydrophobic non-silicone vinylic monomers include $C_1$-$C_{10}$ alkyl (meth) acrylate (e.g., methyl (meth)acrylate, ethyl (meth)acrylate, propyl (meth)acrylate, isopropyl (meth)acrylate, 2-ethylhexyl (meth)acrylate, etc.), cyclohexyl (meth)acrylate, vinyl acetate, vinyl propionate, vinyl butyrate, vinyl valerate, styrene, chloroprene, vinyl chloride, vinylidene chloride, (meth)acrylonitrile, 1-butene, butadiene, vinyl toluene, vinyl ethyl ether, perfluorohexylethyl-thio-carbonyl-aminoethyl-methacrylate, isobornyl (meth)acrylate, trifluoroethyl (meth)acrylate, hexafluoro-isopropyl (meth)acrylate, hexafluorobutyl (meth)acrylate, and combinations thereof.

In accordance with the invention, any thermal free-radical initiators can be used in the invention. Suitable thermal free-radical initiators are known to a skilled artisan and include, for example, peroxides, hydroperoxides, azo-bis (alkyl- or cycloalkylnitriles), persulfates, percarbonates, or mixtures thereof. Examples of preferred thermal free-radical initiators include without limitation benzoyl peroxide, t-butyl peroxide, t-amyl peroxybenzoate, 2,2-bis(tert-butylperoxy) butane, 1,1-bis(tert-butylperoxy)cyclohexane, 2,5-Bis (tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, di-t-butyl-diperoxy-phthalate, t-butyl hydroperoxide, t-butyl peracetate, t-butyl peroxybenzoate, t-butylperoxy isopropyl carbonate, acetyl peroxide, lauroyl peroxide, decanoyl peroxide, dicetyl peroxy-dicarbonate, di (4-t-butylcyclohexyl) peroxy dicarbonate (Perkadox 16S), di (2-ethylhexyl) peroxy dicarbonate, t-butylperoxy pivalate (Lupersol 11); t-butylperoxy-2-ethylhexanoate (Trigonox 21-C50), 2,4-pentanedione peroxide, dicumyl peroxide, peracetic acid, potassium persulfate, sodium persulfate, ammonium persulfate, 2,2'-azobis(4-methoxy-2,4-dimethylvaleronitrile) (VAZO 33), 2,2'-Azobis[2-(2-imidazolin-2-yl) propane]dihydrochloride (VAZO 44), 2,2'-azobis (2-amidinopropane) dihydrochloride (VAZO 50), 2,2'-azobis(2,4-dimethylvaleronitrile) (VAZO 52), 2,2'-azobis (isobutyronitrile) (VAZO 64 or AIBN), 2,2'-azobis-2-methylbutyronitrile (VAZO 67), 1,1-azobis(1-cyclohexanecarbonitrile) (VAZO 88); 2,2'-azobis(2-cyclopropylpropionitrile), 2,2'-azobis(methylisobutyrate), 4,4'-Azobis(4-cyanovaleric acid), and combinations thereof. Preferably, the thermal initiator is 2,2'-azobis(isobutyronitrile) (AIBN or VAZO 64).

In accordance with the invention, the polymerizable composition can further comprise other polymerizable components, such as, one or more UV-absorbing vinylic monomers, one or more UV/HEVL absorbing vinylic monomers, one or more polymerizable photochromic compounds, one or more polymerizable tinting agents (polymerizable dyes), or combinations thereof, as known to a person skilled in the art.

The term "UV/HEVL-absorbing vinylic monomer" refers to a vinylic monomer that can absorb UV light and HEVL (having wavelength between 380 nm and 450 nm).

Any suitable UV-absorbing vinylic monomers and UV/HEVL-absorbing vinylic monomers can be used in a polymerizable composition for preparing a preformed SiHy contact lens of the invention. Examples of preferred UV-absorbing and UV/HEVL-absorbing vinylic monomers include without limitation: 2-(2-hydroxy-5-vinylphenyl)-2H-benzotriazole, 2-(2-hydroxy-5-acryloxyphenyl)-2H-benzotriazole, 2-(2-hydroxy-3-methacrylamido methyl-5-tert octylphenyl)benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxypropylphenyl)benzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl)benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl)benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxyphenol (WL-8), 2-{2'-Hydroxy-3'-tert-5' [3"-(4"-vinylbenzyloxy) propoxy]phenyl}-5-methoxy-2H-benzotriazole, phenol, 2-(5-chloro-2H-benzotriazol-2-yl)-6-(1,1-dimethylethyl)-4-ethenyl-(UVAM), 2-[2'-hydroxy-5'-(2-methacryloxy-ethyl)phenyl)]-2H-benzotriazole (2-Propenoic acid, 2-methyl-, 2-[3-(2H-benzotriazol-2-yl)-4-hydroxyphenyl]ethyl ester, Norbloc), 2-{2'-Hydroxy-3'-tert-butyl-5'-[3'-methacryloyloxypropoxy]-phenyl}-2H-benzotriazole, 2-{2'-Hydroxy-3'-tert-butyl-5'-[3'-methacryloyloxypropoxy]phenyl}-5-methoxy-2H-benzotriazole (UV13), 2-{2'-Hydroxy-3'-tert-butyl-5'-[3'-methacryloyloxypropoxy]-phenyl}-5-chloro-2H-benzotriazole (UV28), 2-[2'-Hydroxy-3'-tert-butyl-5'-(3'-acryloyloxypropoxy)-phenyl]-5-trifluoromethyl-2H-benzotriazole (UV23), 2-(2'-hydroxy-5-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3"-dimethylvinylsilylpropoxy)-2'-hydroxy-phenyl)-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxyphenyl]-propyl ester (16-100, CAS #96478-15-8), 2-(3-(tert-butyl)-4-hydroxy-5-(5-methoxy-2H-benzo[d][1,2,3]triazol-2-yl) phenoxy)ethyl methacrylate (16-102); Phenol, 2-(5-chloro-2H-benzotriazol-2-yl)-6-methoxy-4-(2-propen-1-yl) (CAS #1260141-20-5); 2-[2-Hydroxy-5-[3-(methacryloyloxy) propyl]-3-tert-butylphenyl]-5-chloro-2H-benzotriazole; Phenol, 2-(5-ethenyl-2H-benzotriazol-2-yl)-4-methyl-, homopolymer (9Cl) (CAS #83063-87-0). In accordance with the invention, the polymerizable composition comprises about 0.1% to about 3.0%, preferably about 0.2% to about 2.5%, more preferably about 0.3% to about 2.0%, by weight of one or more UV-absorbing vinylic monomers, related to the amount of all polymerizable components in the polymerizable composition.

The term "photochromic compound" refers to a compound that has one colorless (or light-colored) form and one colored form and can undergo reversible change from the colorless form (or light-colored form) (or so-called "deactivated form" to the colored form (or so-called "activated form") upon exposure to UV or HEVL irradiation.

Any polymerizable photochromic compounds can be used in the invention. Various polymerizable photochromic compounds are disclosed in the patents and published patent applications and can be obtained from commercial sources or prepared by following the procedures described in the patents and literatures. Examples of preferred polymerizable photochromic compounds include without limitation polymerizable naphthopyrans, polymerizable benzopyrans, polymerizable indenonaphthopyrans, polymerizable phenanthropyrans, polymerizable spiro (benzindoline)-naphthopyrans, polymerizable spiro (indoline)benzopyrans, polymerizable spiro (indoline)-naphthopyrans, polymerizable spiro (indoline) quinopyrans, polymerizable spiro (indoline)-pyrans, polymerizable naphthoxazines, polymerizable spirobenzopyrans; polymerizable spirobenzopyrans, polymerizable spirobenzothiopyrans, polymerizable naphthacenediones, polymerizable spirooxazines, polymerizable spiro (indoline) naphthoxazines, polymerizable spiro (indoline)-pyridobenzoxazines, polymerizable spiro (benzindoline)pyridobenzoxazines, polymerizable spiro (benzindoline) naphthoxazines, polymerizable spiro (indoline)-benzoxazines, polymerizable diarylethenes, and combinations thereof, as disclosed in U.S. Pat. Nos. 4,929,693, 5,166,345 6,017,121, 7,556,750, 7,584,630, 7,999,989, 8,158,037, 8,697,770, 8,741,188, 9,052,438, 9,097,916, 9,465,234, 9,904,074, 10,197,707, 6,019,914, 6,113,814, 6,149,841, 6,296,785, and 6,348,604.

It is understood that the amount of one or more UV-absorbing vinylic monomers in the polymerizable composition is sufficient to render a contact lens, which is obtained from the curing of the polymerizable composition, an ability of blocking or absorbing (i.e., the inverse of transmittance) at least 90% (preferably at least about 95%, more preferably at least about 97.5%, even more preferably at least about 99%) of UVB (between 280 and 315 nanometers), at least 70% (preferably at least about 80%, more preferably at least about 90%, even more preferably at least about 95%) of UVA transmittance (between 315 and 380 nanometers), and optionally (but preferably) at least 30% (preferably at least about 40%, more preferably at least about 50%, even more preferably at least about 60%) of violet light between 380 nm and 440 nm, which impinge on the lens.

A polymerizable composition of the invention can further comprise antimicrobial agents (e.g., silver nanoparticles), a bioactive agent (e.g., a drug, an amino acid, a polypeptide, a protein, a nucleic acid, 2-pyrrolidone-5-carboxylic acid (PCA), an alpha hydroxyl acid, linoleic and gamma linoleic acids, vitamins, or any combination thereof), leachable lubricants (e.g., a non-crosslinkable hydrophilic polymer having an average molecular weight from 5,000 to 500,000, preferably from 10,000 to 300,000, more preferably from 20,000 to 100,000 Daltons), leachable tear-stabilizing agents (e.g., a phospholipid, a monoglyceride, a diglyceride, a triglyceride, a glycolipid, a glyceroglycolipid, a sphingolipid, a sphingo-glycolipid, a fatty acid having 8 to 36 carbon atoms, a fatty alcohol having 8 to 36 carbon atoms, or a mixture thereof), or combinations thereof, as known to a person skilled in the art.

In accordance with the invention, a polymerizable composition of the invention is a fluid composition, which can be a solution, a solventless blend (i.e., a fluid composition free of any non-reactive diluent-organic solvent).

Where a polymerizable composition of the invention is a solution. It can be prepared by dissolving all of the desirable components in any suitable solvent known to a person skilled in the art. Example of suitable solvents includes without limitation, water, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof. Preferably, a polymerizable composition is a solution of all the desirable components in water, 1,2-propylene glycol, a polyethyleneglycol having a molecular weight of about 400 Daltons or less, or a mixture thereof.

Where a polymerizable composition of the invention is a solventless blend, it can be prepared by mixing all polymerizable components and other necessary component. A solventless polymerizable composition typically comprises at least one blending vinylic monomer as a reactive solvent for dissolving all other polymerizable components of the solventless polymerizable composition. Examples of preferred blending vinylic monomers are described later in this application. Preferably, methyl methacrylate is used as a blending vinylic monomer in preparing a solventless polymerizable composition.

In accordance with the invention, the polymerizable composition can be introduced (dispensed) into a cavity formed by a mold according to any known methods. A specific amount of a polymerizable lens-forming material is typically dispensed into a female mold half by means of a dispensing device and then a male mold half is put on and the mold is closed. As the mold closes, any excess unpolymerized lens-forming material is pressed into an overflow provided on the female mold half (or alternatively on the male mold half).

The curing of the polymerizable composition within the cavity of the closed mold is carried out thermally (i.e., by heating) to activate the polymerization initiators, as known to a person skilled in the art.

For example, the thermal curing of the polymerizable composition in a lens mold can be carried out conveniently in an oven at one or more temperatures of from 25 to 120 °C and preferably 40 to 100 °C, as well known to a person skilled in the art. The reaction time may vary within wide limits, but is conveniently, for example, from 1 to 24 hours or preferably from 2 to 12 hours. It is advantageous to previously degas the polymerizable composition and to carry out said polymerization reaction under an inert atmosphere, e.g., under $N_2$ or Ar atmosphere.

After the curing step, the steps of opening a mold (i.e., separating the male mold half from the female mold half with the lens precursor attached onto one of the male and female mold halves and delensing (i.e., removing the lens precursor from the lens-precursor adhered mold half) are carried out according to any techniques known to a person skilled in the art.

Separating of the molds can be carried out according to any techniques known to a person skilled in the art. It is understood that the molded lens precursor is adhered onto the one of the female and male mold halves. Many techniques are known in the art. For example, the molding surface of the mold half designed to adhere the molded lens precursor can be surface-treated to render the molded lens precursor preferentially adhered to the molding surface of this mold half. Alternatively, a compression force can be applied by using a mold-opening device to non-optical surface (opposite to the molding surface) of the mold half (not adhering the molded lens precursor) of the mold at a location about the center area of non-optical molding surface at an angle of less than about 30 degrees, preferably less than about 10 degrees, most preferably less than about 5 degrees (i.e., in a direction substantially normal to center area of non-optical molding surface) relative to the axis of the mold to deform the mold half, thereby breaking bonds between the molding surface of the mold half and the molded lens precursor. Various ways of applying a force to non-optical surface of the mold half at a location about the center area of non-optical molding surface along the axis of the mold to deform the mold half which breaks the bonds between the optical molding surface of the mold half and the molded lens precursor. It is understood that the mold-opening device can have any configurations known to a person skilled in the art for performing the function of separating two mold halves from each other.

After the lens precursor is delensed, it typically is extracted with an extraction medium as well known to a person skilled in the art. The extraction liquid medium is any solvent capable of dissolving the diluent(s), unpolymerized polymerizable materials, and oligomers in the lens precursor. Water, any organic solvents described above or known to a person skilled in the art, or a mixture thereof can be used in the invention.

The extracted contact lens can then be hydrated according to any method known to a person skilled in the art.

The extracted and/or hydrated contact lens can further subject to further processes, such as, for example, surface treatment, packaging in lens packages with a packaging solution which is well known to a person skilled in the art; sterilization such as autoclave at from 118 to 124 °C for at least about 30 minutes; and the like.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120 °C or higher for at least 30 minutes under pressure) prior to dispensing to users. A person skilled in the art will understand well how to seal and sterilize lens packages.

A contact lens of the invention has an oxygen permeability of preferably at least about 40 barrers, more preferably at least about 60 barrers, even more preferably at least about 80 barrers (at about 35 °C).

A contact lens of the invention has an elastic modulus of about 1.5 MPa or less, preferably about 1.2 MPa or less, more preferably from about 0.3 MPa to about 1.0 MPa (at a temperature of from about 22 °C to 28 °C).

A contact lens of the invention further has an equilibrium water content of from about 15% to about 75%, more preferably from about 20% to about 70% by weight, even more preferably from about 25% to about 65% by weight (at room temperature) when fully hydrated. The equilibrium water content of a photochromic SiHy contact lens can be measured according to the procedure disclosed in Example 1.

In a further aspect, the invention provides a HEVL-filtering contact lens obtained by the method of the invention.

All of the various embodiments of the molds, polymerizable composition, curing, and contact lens of the invention described above can be used in this aspect of the invention.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

1. A method for producing HEVL-filtering contact lenses, comprising the steps of:
(1) providing a mold for making a contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces;
(2) introducing a polymerizable composition into the cavity, wherein the polymerizable composition comprises
(a) at least one Cu(II)-meso-aryl-substituted porphyrin,
(b) from about 20% to about 70% by weight of at least one hydrophilic vinylic monomer, wherein said at least one hydrophilic vinylic monomer comprises at least one hydrophilic N-vinyl amide monomer that is present in an amount in the polymerizable composition sufficient for ensuring said at least one Cu(II)-meso-aryl-substituted porphyrin to be grafted a polymer matrix formed from the polymerizable composition,
(c) at least one siloxane-containing vinylic monomer,
(d) at least one polysiloxane vinylic crosslinker and/or at least one non-silicone vinylic crosslinker,
(e) from 0 to about 15% by weight of at least one hydrophobic non-silicone vinylic monomer, and
(f) at least one thermal free radical initiator, wherein the sum of the amounts of components (a) to (f) is at least 95% by weight relative to total amount of all polymerizable components in the polymerizable composition;
(3) curing thermally the polymerizable composition in the mold in an oven to form a lens precursor that comprises the polymer matrix having Cu(II)-meso-aryl-substituted porphyrin grafted thereto; and
(4) subjecting the lens precursor to one or more post-molding processes selected from the group consisting of extraction, surface treatment, hydration, packaging, sterilization, and combinations thereof, to form a HEVL-filtering contact lens capable of filtering HEVL.
2. The method of embodiment 1, wherein each of the four aryl groups of each of said at least Cu(II)-meso-aryl-substituted porphyrin is a substituted phenyl group which has at least two substituents located at 2- and 6-positions of the substituted phenyl group.
3. The method of embodiment 1 or 2, wherein said at least one Cu(II)-meso-aryl-substituted porphyrin is represented by formula (P1)

(P1)

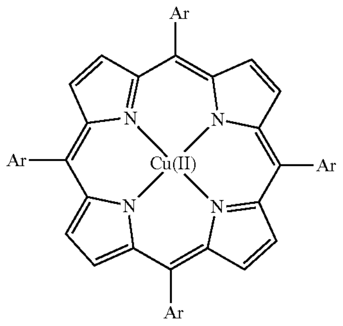

-continued

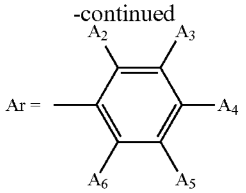

in which $A_2$ and $A_6$ independent of each other are Cl, F, $CCl_3$, $CF_3$, $CH_3$, $CH(CH_3)_2$, $C(CH_3)_3$, $OCH_3$, OH, or $NO_2$, $A_3$, $A_4$ and $A_5$ independent of one another are H, Cl, F, $CCl_3$, $CF_3$, $CH_3$, $CH(CH_3)_2$, $C(CH_3)_3$, $OCH_3$, OH, $NH_2$, or $NO_2$. In a preferred embodiment, $A_2$, $A_3$, $A_4$, $A_5$, and $A_6$ are identical to one other and are $C_1$ or F.
4. The method of embodiment 3, wherein, in formula (P1), $A_2$ and $A_6$ independent of each other are Cl, F, or $NO_2$.
5. The method of embodiment 3, wherein, in formula (P1), $A_2$, $A_3$, $A_4$, $A_5$, and $A_6$ are identical to one other and are $C_1$ or F.
6. The method of embodiment 3, wherein in formula (P1) $A_2$ and $A_6$ independent of each other are Cl or F; $A_4$ and $A_5$ are H; and $A_3$ is Cl, F, $CCl_3$, $CF_3$, $CH_3$, $CH(CH_3)_2$, $C(CH_3)_3$, $OCH_3$, OH, $NH_2$, or $NO_2$.
7. The method of embodiment 3, wherein in formula (P1) $A_2$ and $A_6$ independent of each other are $C_1$ or F; $A_3$ and $A_5$ are H; and $A_4$ is Cl, F, $CCl_3$, $CF_3$, $CH_3$, $CH(CH_3)_2$, $C(CH_3)_3$, $OCH_3$, OH, $NH_2$, or $NO_2$.
8. The method of any one of embodiments 1 to 3, wherein said at least one Cu(II)-meso-aryl-substituted porphyrin is selected from the group consisting of 5,10,15,20-tetrakis(2,6-dichlorophenyl)-porphyrin-Cu(II), 5,10,15,20-tetrakis(2,6-difluorophenyl)-porphyrin-Cu(II), 5,10,15,20-tetrakis(2-chloro-6-fluorophenyl)-porphyrin-Cu(II), 5,10,15,20-tetrakis(2,6-dinitrophenyl)-porphyrin-Cu(II), 5,10,15,20-tetrakis(2,3,6-trichlorophenyl)-porphyrin-Cu(II), 5,10,15,20-tetrakis(2,3,6-trifluorophenyl)-porphyrin-Cu(II), 5,10,15,20-tetrakis (2,4,6-trinitrophenyl)-porphyrin-Cu(II), 5,10,15,20-tetrakis(2,4,6-trimethylphenyl)-porphyrin-Cu(II), 5,10,15,20-tetrakis(2,6-dichloro-3-aminophenyl)-porphyrin-Cu(II), 5,10,15,20-tetrakis(4-bromo-2,6-dichlorophenyl)-porphyrin-Cu(II), 5, 10, 15,20-tetrakis (2,6-dichloro-4-nitrophenyl)-porphyrin-Cu(II), 5,10,15,20-tetrakis(2,6-dichloro-3-nitrophenyl)-porphyrin-Cu(II), 5,10,15,20-tetrakis(2,6-dihydroxyphenyl)-porphyrin-Cu(II), 5,10,15,20-tetrakis(2,6-dimethoxyphenyl)-porphyrin-Cu(II), 5,10,15,20-tetrakis(pentachlorophenyl)-porphyrin-Cu(II), 5,10,15,20-tetrakis (pentafluorophenyl)-porphyrin-Cu(II), 10,15,20-tris(2,6-dichlorophenyl)-5-(2,3,4,5,6-pentafluorophenyl)-porphyrin-Cu(II), 5,10,15-tris (pentafluorophenyl)-20-(2.6-dichlorophenyl)-porphyrin-Cu (II), 10,20-bis(2,6-dichlorophenyl)-5,15-bis(2,3,4,5,6-pentafluorophenyl)-porphyrin-Cu(II), and combinations thereof.
9. The method of any one of embodiments 1 to 8, wherein said at least one hydrophilic N-vinyl amide monomer is selected from the group consisting of N-vinylpyrrolidone, N-vinyl piperidone, N-vinyl caprolactam, N-vinyl-N-methyl acetamide, N-vinyl formamide, N-vinyl acetamide, N-vinyl isopropylamide, N-vinyl-N-methyl acetamide, N-vinyl-N-ethyl acetamide, N-vinyl-N-ethyl formamide, and mixtures thereof.

10. The method of any one of embodiments 1 to 8, wherein said at least one hydrophilic N-vinyl amide monomer is selected from the group consisting of N-vinylpyrrolidone, N-vinyl-N-methyl acetamide, and combinations thereof.
11. The method of any one of embodiments 1 to 10, wherein the polymerizable composition comprises from about 15% to about 70% by weight of said at least one hydrophilic N-vinyl amide monomer, relative to total amount of all polymerizable components in the polymerizable composition.
12. The method of any one of embodiments 1 to 10, wherein the polymerizable composition comprises from about 20% to about 65% by weight of said at least one hydrophilic N-vinyl amide monomer, relative to total amount of all polymerizable components in the polymerizable composition.
13. The method of any one of embodiments 1 to 10, wherein the polymerizable composition comprises from about 25% to about 65% by weight of said at least one hydrophilic N-vinyl amide monomer, relative to total amount of all polymerizable components in the polymerizable composition.
14. The method of any one of embodiments 1 to 10, wherein the polymerizable composition comprises from about 30% to about 65% by weight of said at least one hydrophilic N-vinyl amide monomer, relative to total amount of all polymerizable components in the polymerizable composition.
15. The method of any one of embodiments 1 to 10, wherein the polymerizable composition comprises from about 35% to about 60% by weight of said at least one hydrophilic N-vinyl amide monomer, relative to total amount of all polymerizable components in the polymerizable composition.
16. The method of any one of embodiments 1 to 15, wherein the polymerizable composition comprises at least one hydrophilic vinylic monomer selected from the group consisting of a hydrophilic (meth)acrylamido monomer, a hydrophilic (meth)acryloxy monomer, a methylene-containing pyrrolidone monomer, a vinyl ether monomer, an allyl ether monomer, a phosphorylcholine-containing vinylic monomer, allyl alcohol, N-2-hydroxyethyl vinyl carbamate, N-vinyloxycarbonyl-β-alanine (VINAL), N-vinyloxycarbonyl-α-alanine, and combinations thereof.
17. The method of any one of embodiments 1 to 15, wherein the polymerizable composition comprises: comprises: (1) an alkyl (meth)acrylamide selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof; (2) a hydroxyl-containing acrylic monomer selected from the group consisting of N-2-hydroxylethyl (meth) acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris (hydroxymethyl)-methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri (ethylene glycol) (meth)acrylate, tetra(ethylene glycol) (meth)acrylate, poly (ethylene glycol) (meth)acrylate having a number average molecular weight of up to 1500, poly(ethylene glycol)ethyl (meth)acrylamide having a number average molecular weight of up to 1500, and combinations thereof; (3) a carboxyl-containing acrylic monomer selected from the group consisting of 2-(meth)acrylamidoglycolic acid, (meth)acrylic acid, ethylacrylic acid, 3-(meth)acrylamidopropionic acid, 5-(meth)acrylamidopentanoic acid, 4-(meth)acrylamidobutanoic acid, 3-(meth)acrylamido-2-methylbutanoic acid, 3-(meth)acrylamido-3-methylbutanoic acid, 2-(meth) acrylamido-2methyl-3,3-dimethyl butanoic acid, 3-(meth)acrylamidohaxanoic acid, 4-(meth)acrylamido-3,3-dimethylhexanoic acid, and combinations thereof; (4) an amino-containing acrylic monomer selected from the group consisting of N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth) acrylamide, N-3-dimethylaminopropyl (meth) acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth) acrylate hydrochloride, dimethylaminoethyl (meth) acrylate, and combinations thereof; (5) a methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof; (6) an acrylic monomer having a $C_1$-$C_4$ alkoxyethoxy group and selected from the group consisting of ethylene glycol methyl ether (meth)acrylate, di (ethylene glycol) methyl ether (meth)acrylate, tri (ethylene glycol) methyl ether (meth)acrylate, tetra(ethylene glycol) methyl ether (meth)acrylate, $C_1$-$C_4$-alkoxy poly (ethylene glycol) (meth)acrylate having a number average molecular weight of up to 1500, methoxy-poly(ethylene glycol)ethyl (meth)acrylamide having a number average molecular weight of up to 1500, and combinations thereof; (7) a vinyl ether monomer selected from the group consisting of ethylene glycol monovinyl ether, di(ethylene glycol) monovinyl ether, tri (ethylene glycol) monovinyl ether, tetra(ethylene glycol) monovinyl ether, poly (ethylene glycol) monovinyl ether, ethylene glycol methyl vinyl ether, di(ethylene glycol) methyl vinyl ether, tri (ethylene glycol) methyl vinyl ether, tetra(ethylene glycol) methyl vinyl ether, poly(ethylene glycol) methyl vinyl ether, and combinations thereof; (8) an allyl ether monomer selected from the group consisting of ethylene glycol monoallyl ether, di(ethylene glycol) monoallyl ether, tri (ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri (ethylene glycol) methyl allyl ether, tetra(ethylene glycol) methyl allyl ether, poly (ethylene glycol) methyl allyl ether, and combinations thereof; (9) a phosphorylcholine-containing vinylic monomer selected from the group consisting of (meth) acryloyloxyethyl phosphorylcholine, (meth)acryloyloxypropyl phosphorylcholine, 4-((meth)acryloyloxy) butyl-2'-(trimethylammonio) ethylphosphate, 2-[(meth)acryloylamino]ethyl-2'-(trimethylammonio)-ethylphosphate, 3-[(meth)acryloylamino]propyl-2'-(trimethylammonio)-ethylphosphate, 4-[(meth)acryloylamino]butyl-2'-(trimethylammonio) ethylphosphate, 5-((meth)acryloxy) pentyl-2'-(trimethylammonio)ethyl phosphate, 6-((meth)acryloxy) hexyl-2'-(trimethylammonio)-ethylphosphate, 2-((meth)acryloxy)ethyl-2'-(triethylammonio) ethylphosphate, 2-((meth)acryloxy)ethyl-2'-(tripropylammonio) ethylphosphate, 2-((meth)acryloxy)ethyl-2'-(tributylammonio)ethyl phosphate, 2-((meth)acryloxy) propyl-2'-(trimethylammonio) ethylphosphate, 2-((meth)acryloxy)butyl-2'-(trimethylammonio) ethylphosphate, 2-((meth)acryloxy) pentyl-2'-(trimethylammonio) ethylphosphate, 2-((meth)acryloxy) hexyl-2'-(trimethylammonio) ethylphosphate, 2-(vinyloxy) ethyl-2'-. (trimethylammonio) ethylphosphate, 2-(allyloxy)ethyl-2'-(trimethylammonio) ethylphosphate, 2-(vinyloxycarbonyl)ethyl-2'-(trimethylammonio)ethyl phosphate, 2-(allyloxycarbonyl)ethyl-2'-(trimethylammonio) ethylphosphate, 2-(vinylcarbonylamino)ethyl-2'-(trimethylammonio)-ethylphosphate, 2-(allyloxycarbonylamino)ethyl-2'-(trimethylammonio)ethyl phosphate, 2-(butenoyloxy) ethyl-2'-(trimethylammonio) ethylphosphate, and combinations thereof; (10) allyl alcohol; (11) N-2-hydroxyethyl vinyl carbamate; (12) N-carboxyvinyl-β-alanine (VINAL); (13) N-carboxyvinyl-α-alanine; (14) or combinations thereof.

18. The method of any one of embodiments 1 to 17, wherein said at least one siloxane-containing vinylic monomer is selected from the group consisting of α-(meth)acryloxypropyl terminated ω-$C_1$-$C_4$-alkyl terminated polydimethylsiloxane, α-(meth)acryloxy-2-hydroxy-propyloxypropyl terminated ω-$C_1$-$C_4$-alkyl terminated polydimethylsiloxane, α-(2-hydroxyl-methacryloxypropyloxypropyl)-ω-$C_1$-$C_4$-alkyl-decamethylpentasiloxane, α-[3-(meth)acryloxy-ethoxy-2-hydroxypropyloxypropyl]-terminated ω-$C_1$-$C_4$-alkyl terminated polydimethylsiloxane, α-[3-(meth)acryloxy-propyloxy-2-hydroxypropyloxypropyl]-terminated ω-$C_1$-$C_4$-alkyl terminated polydimethylsiloxane, α-[3-(meth)acryloxyisopropyloxy-2-hydroxy-propyloxypropyl]-terminated ω-$C_1$-$C_4$-alkyl terminated polydimethylsiloxane, α-[3-(meth)acryloxybutyloxy-2-hydroxypropyloxypropyl]-terminated ω-$C_1$-$C_4$-alkyl terminated polydimethylsiloxane, α-[3-(meth)acryloxyethylamino-2-hydroxypropyloxypropyl]-terminated ω-$C_1$-$C_4$-alkyl terminated polydimethylsiloxane, α-[3-(meth)acryloxypropylamino-2-hydroxy-propyloxypropyl]-terminated ω-$C_1$-$C_4$-alkyl terminated polydimethylsiloxane, α-[3-(meth)acryloxy-butylamino-2-hydroxypropyloxypropyl]-terminated ω-$C_1$-$C_4$-alkyl terminated polydimethylsiloxane, α-(meth) acryloxy (polyethylenoxy)-2-hydroxypropyloxypropyl]-terminated ω-$C_1$-$C_4$-alkyl terminated polydimethylsiloxane, α-[(meth)acryloxy-2-hydroxy-propyloxy-ethoxypropyl]-terminated ω-$C_1$-$C_4$-alkyl terminated polydimethylsiloxane, α-[(meth) acryloxy-2-hydroxypropyl-N-ethylaminopropyl]-terminated ω-$C_1$-$C_4$-alkyl terminated polydimethylsiloxane, α-[(meth)acryloxy-2-hydroxypropyl-aminopropyl]-terminated ω-$C_1$-$C_4$-alkyl terminated polydimethylsiloxane, α-[(meth)acryloxy-2-hydroxypropyloxy-(polyethylenoxy) propyl]-terminated ω-$C_1$-$C_4$-alkyl terminated polydimethylsiloxane, α-(meth)acryloylamidopropyloxypropyl terminated ω-$C_1$-$C_4$-alkyl terminated polydimethylsiloxane, α-N-methyl-(meth)acryloylamidopropyloxypropyl terminated ω-$C_1$-$C_4$-alkyl terminated polydimethylsiloxane, α-[3-(meth)acrylamidoethoxy-2-hydroxypropyloxy-propyl]-terminated ω-$C_1$-$C_4$-alkyl polydimethylsiloxane, α-[3-(meth)acrylamidopropyloxy-2-hydroxypropyloxypropyl]-terminated ω-$C_1$-$C_4$-alkyl terminated polydimethylsiloxane, α-[3-(meth)acrylamidoisopropyloxy-2-hydroxypropyloxypropyl]-terminated ω-$C_1$-$C_4$-alkyl terminated polydimethylsiloxane, α-[3-(meth)acrylamidobutyloxy-2-hydroxypropyloxypropyl]-terminated ω-$C_1$-$C_4$-alkyl terminated polydimethylsiloxane, α-[3-(meth)acryloylamido-2-hydroxypropyloxypropyl] terminated ω-$C_1$-$C_4$-alkyl polydimethylsiloxane, α-[3-[N-methyl-(meth) acryloylamido]-2-hydroxypropyloxypropyl] terminated ω-$C_1$-$C_4$-alkyl terminated polydimethylsiloxane, N-methyl-N'-(propyltetra(dimethylsiloxy) dimethylbutylsilane) (meth)acrylamide, N-(2,3-dihydroxypropane)-N'-(propyltetra(dimethylsiloxy) dimethylbutylsilane) (meth)acrylamide, (meth) acryloylamidopropyltetra(dimethylsiloxy) dimethylbutylsilane, α-vinyl carbonate-terminated ω-$C_1$-$C_4$-alkyl-terminated polydimethylsiloxane, α-vinylcarbamate-terminated ω-$C_1$-$C_4$-alkyl-terminated polydimethylsiloxane, and a mixture thereof.

19. The method of any one of embodiments 1 to 17, wherein said at least one siloxane-containing vinylic monomer is selected from the group consisting of a vinylic monomer having a bis(trialkylsilyloxy) alkylsilyl group, a vinylic monomer having a tris(trialkylsilyloxy) silyl group, a polysiloxane vinylic monomer, 3-methacryloxy propylpentamethyldisiloxane, t-butyldimethyl-siloxyethyl vinyl carbonate, trimethylsilylethyl vinyl carbonate, and trimethylsilylmethyl vinyl carbonate, and combinations thereof.

20. The method of any one of embodiments 1 to 19, wherein said at least one siloxane-containing vinylic monomer comprises at least one vinylic monomer of formula (M1) or (M2)

(M1)

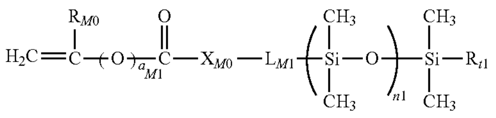

(M2)

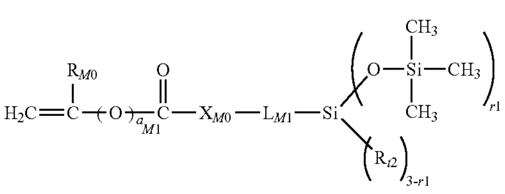

in which: $a_{M1}$ is zero or 1; $R_{M0}$ is H or methyl; $X_{M0}$ is O or $NR_{M1}$; $L_{M1}$ is a $C_2$-$C_5$ alkylene divalent radical or a divalent radical of $—L_{M1}'—X_{M1}—L_{M1}''—$, $—(C_2H_4O)_{v1}CONH—L_{M1}''—$, $—(C_2H_4O)_{v1}L_{M1}''—$, $—L_{M1}'—NHCOO—(C_2H_4O)_{v1}L_{M1}''—$, $—CH_2—CH(OH)—CH_2—X_{M1}'—(C_2H_4O)_{v2}L_{M1}''—$, $—L_{M1}'—X_{M1}'—CH_2—CH(OH)—CH_2—O—L_{M1}''—$, or $—(C_2H_4O)_{v1}CH_2—CH(OH)—CH_2—O—L_{M1}''—$;

$L_{M1}'$ is a $C_2$-$C_8$ alkylene divalent radical which has zero or one hydroxyl group; $L_{M1}''$ is $C_3$-$C_8$ alkylene divalent radical which has zero or one hydroxyl group; $X_{M1}$ is O, $NR_{M1}$, NHCOO, OCONH, $CONR_{M1}$, or $NR_{M1}CO$; $R_{M1}$ is H or a $C_1$-$C_4$ alkyl having 0 to 2 hydroxyl group; $R_{t1}$ and $R_{t2}$ independent of each other are a $C_1$-$C_6$ alkyl; $X_{M1}'$ is O or $NR_1$; v1 is an integer of 1 to 30; m2 is an integer of 0 to 30; n1 is an integer of 3 to 40; and r1 is an integer of 2 or 3.

21. The method of any one of embodiments 1 to 19, wherein said at least one siloxane-containing vinylic monomer comprises tris(trimethylsilyloxy) silylpropyl (meth)acrylate, [3-(meth)acryloxy-2-hydroxypropyloxy]propylbis(trimethylsiloxy) methylsilane, [3-(meth)acryloxy-2-hydroxypropyloxy]propylbis(trimethylsiloxy)butylsilane, 3-(meth)acryloxy-2-(2-hydroxyethoxy)-propyloxy) propylbis(trimethylsiloxy) methylsilane, 3-(meth)acryloxy-2-hydroxypropyloxy) propyltris(trimethylsiloxy) silane, N-[tris(trimethylsiloxy) silylpropyl]-(meth)acrylamide, N-(2-hydroxy-3-(3-(bis(trimethylsilyloxy)methylsilyl) propyloxy) propyl)-2-methyl (meth)acrylamide, N-(2-hydroxy-3-(3-(bis(trimethylsilyloxy)methylsilyl) propyloxy)-propyl) (meth)acrylamide, N-(2-hydroxy-3-(3-(tris(trimethylsilyloxy) silyl) propyloxy) propyl)-2-methyl acrylamide, N-(2-hydroxy-3-(3-(tris(trimethylsilyloxy) silyl) propyloxy) propyl) (meth)acrylamide, N-[tris(dimethylpropylsiloxy) silylpropyl]-(meth)acrylamide, N-[tris(dimethyl-phenylsiloxy)-silylpropyl](meth) acrylamide, N-[tris(dimethylethylsiloxy)-silylpropyl] (meth)acrylamide, N,N-bis[2-hydroxy-3-(3-(bis(trimethylsilyloxy)methylsilyl)-propyloxy) propyl]-2-methyl (meth)acrylamide, N,N-bis[2-hydroxy-3-(3-(bis(trimethylsilyloxy)-methylsilyl) propyloxy)-propyl](meth)acrylamide, N,N-bis[2-hydroxy-3-(3-(tris(trimethyl-silyloxy) silyl) propyloxy)-propyl]-2-methyl (meth)acrylamide, N,N-bis[2-hydroxy-3-(3-(tris(trimethylsilyloxy) silyl)-propyloxy) propyl] (meth)acrylamide, N-[2-hydroxy-3-(3-(t-butyldimethylsilyl) propyloxy)-propyl]-2-methyl (meth) acrylamide, N-[2-hydroxy-3-(3-(t-butyldimethylsilyl) propyloxy)-propyl](meth)acrylamide, N,N-bis[2-hydroxy-3-(3-(t-butyldimethylsilyl) propyloxy) propyl]-2-methyl (meth)acrylamide, N-2-(meth)acryloxyethyl-O-(methyl-bis-trimethylsiloxy-3-propyl) silyl carbamate, 3-(trimethylsilyl) propylvinyl carbonate, 3-(vinyloxycarbonylthio)-propyl-tris(trimethyl-siloxy) silane, 3-[tris(trimethylsiloxy) silyl]propylvinyl carbamate, 3-[tris(trimethylsiloxy) silyl]propyl allyl carbamate, 3-[tris(trimethylsiloxy)-silyl]propyl vinyl carbonate, or a combination thereof.

22. The method of any one of embodiments 1 to 21, wherein the polymerizable composition comprises at least one polysiloxane vinylic crosslinker.

23. The method of embodiment 22, wherein said at least one polysiloxane vinylic crosslinker comprises a di-(meth)acryloyloxy-terminated polysiloxane vinylic crosslinker having dimethylsiloxane units and hydrophilized siloxane units each having one methyl substituent and one monovalent $C_4$-$C_{40}$ organic radical substituent having 2 to 6 hydroxyl groups.

24. The method of embodiment 22, wherein said at least one polysiloxane vinylic crosslinker comprises at least one hydrophilized polysiloxane vinylic crosslinker of formula (G)

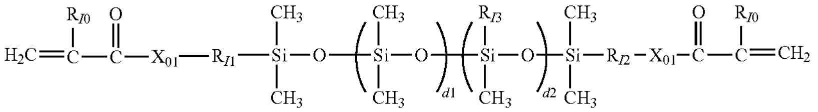

(G)

in which:

d1 is an integer of from 30 to 500 and d2 is an integer of from 1 to 75, provided that d2/d1 is from about 0.035 to about 0.15;

$X_{01}$ is O or $NR_{IN}$ in which $R_{IN}$ is hydrogen or $C_1$-$C_{10}$-alkyl;

$R_{I0}$ is hydrogen or methyl;

$R_{I1}$ and $R_{I2}$ independently of each other are a substituted or unsubstituted $C_1$-$C_{10}$ alkylene divalent radical or a divalent radical of $—R_{I4}—O—R_{I5}—$ in which $R_{I4}$ and $R_{I5}$ independently of each other are a substituted or unsubstituted $C_1$-$C_{10}$ alkylene divalent radical;

$R_{I3}$ is a monovalent radical of any one of formula (G-1) to (G-5)

(G-1)

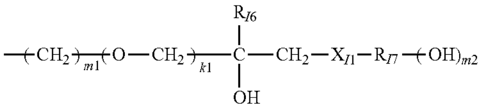

(G-2)

$—(CH_2)_{m3}X_{I2}—R_{I8}—(OH)_{m4}$ (G-3)

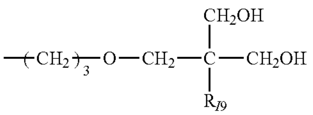

-continued (G-4)

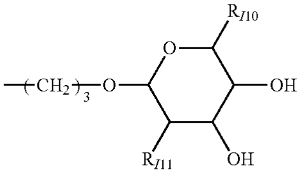

(G-5)

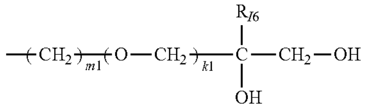

k1 is zero or 1; m1 is an integer of 2 to 4; m2 is an integer of 1 to 5; m3 is an integer of 3 to 6; m4 is an integer of 2 to 5;

$R_{I6}$ is hydrogen or methyl;

$R_{I7}$ is a $C_2$-$C_6$ hydrocarbon radical having (m2+1) valencies;

$R_{I8}$ is a $C_2$-$C_6$ hydrocarbon radical having (m4+1) valencies;

$R_{I9}$ is ethyl or hydroxymethyl;

$R_{I10}$ is methyl or hydromethyl;

$R_{I11}$ is hydroxyl or methoxy;

$X_{I1}$ is a sulfur linkage of —S— or a teriary amino linkage of $—NR_{I12}—$ in which $R_{I12}$ is $C_1$-$C_1$ alkyl, hydroxyethyl, hydroxypropyl, or 2,3-dihydroxypropyl; and $X_{I2}$ is an amide linkage of

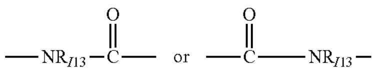

in which $R_{I13}$ is hydrogen or $C_1$-$C_{10}$ alkyl.

25. The method of embodiment 22, wherein said at least one polysiloxane vinylic crosslinker comprises: (1) a vinylic crosslinker which comprises one sole polydiorganosiloxane segment and two terminal ethylenically-unsaturated groups selected from the group consisting of (meth)acryloyloxy groups, (meth)acryloylamino groups, vinyl carbonate groups, vinylcarbamate groups; and/or (2) a chain-extended polysiloxane vinylic crosslinker which comprises at least two polydiorganosiloxane segment and a covalent linker between each pair of polydiorganosiloxane segments and two two terminal ethylenically-unsaturated groups selected from the group consisting of (meth)acryloyloxy groups, (meth)acryloylamino groups, vinyl carbonate groups, vinylcarbamate groups.

26. The method of embodiment 22, wherein said at least one polysiloxane vinylic crosslinker comprises α, ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxy-propyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxy-propyloxy-2-hydroxypropyloxypropyl]-terminated polydimethylsiloxane, α, ω-bis[3-(meth)acryloxy-isopropyloxy-2-hydroxypropyloxypropyl]-terminated polydimethylsiloxane, α, ω-bis[3-(meth)acryloxybutyloxy-2-hydroxypropyloxypropyl]-terminated polydimethylsiloxane, α, ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxy-propyl]-terminated polydimethylsiloxane, α,ω-bis[3-(meth)acrylamidoisopropyloxy-2-hydroxy-propyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α, ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α, ω-bis[(meth)acrylamidoethylamino-2-hydroxypropyloxy-propyl]-terminated polydimethylsiloxane, α,ω-bis[3-(meth)acrylamidopropylamino-2-hydroxy-propyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy) propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy) propyl]-terminated polydimethylsiloxane, or combinations thereof.

27. The method of any one of embodiments 1 to 26, wherein the polymerizable composition comprises at least one non-silicone vinylic crosslinker.

28. The method of embodiment 27, wherein said at least one non-silicone vinylic crosslinker comprises ethyleneglycol di-(meth)acrylate, diethyleneglycol di-(meth)acrylate, triethylene-glycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy (2-hydroxy-propane-1,3-diyl)] di-(meth)acrylate, bis[2-(meth)acryloxyethyl]phosphate, trimethylol-propane di-(meth)acrylate, and 3,4-bis[(meth)acryloyl]tetrahydrofuan, diacrylamide, dimethacrylamide, N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxy-ethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, allyl-methacrylate, allylacrylate, N-allyl-methacrylamide, N-allyl-acrylamide, or mixtures thereof.

29. The method of any one of embodiments 1 to 28, wherein the polymerizable composition comprises at least one hydrophobic non-silicone vinylic monomer.
30. The method of embodiment 29, wherein said at least one hydrophobic vinylic monomer comprises $C_1$-$C_{10}$ alkyl (meth)acrylate, cyclopentylacrylate, cyclohexylmethacrylate, cyclohexylacrylate, isobornyl (meth) acrylate, styrene, 4,6-trimethylstyrene (TMS), t-butyl styrene (TBS), trifluoroethyl (meth)acrylate, hexafluoro-isopropyl (meth)acrylate, hexafluorobutyl (meth)acrylate, or combinations thereof.
31. The method of any one of embodiments 1 to 30, wherein the polymerizable composition further comprises at least one polymerizable materials selected from the group consisting of a UV-absorbing vinylic monomer, a UV/HEVL-absorbing vinylic monomer, a photochromic vinylic monomer, a polymerizable dye, and combinations thereof.
32. The method of any one of embodiments 1 to 31, wherein the polymerizable composition comprises from about 5% to about 50% by weight of said at least one siloxane-containing vinylic monomer, relative to total amount of all polymerizable components in the polymerizable composition.
33. The method of any one of embodiments 1 to 31, wherein the polymerizable composition comprises from about 5% to about 45% by weight of said at least one siloxane-containing vinylic monomer, relative to total amount of all polymerizable components in the polymerizable composition.
34. The method of any one of embodiments 1 to 31, wherein the polymerizable composition comprises from about 10% to about 40% by weight of said at least one siloxane-containing vinylic monomer, relative to total amount of all polymerizable components in the polymerizable composition.
35. The method of any one of embodiments 1 to 34, wherein the polymerizable composition comprises from about 5% to about 50% by weight of said at least one polysiloxane vinylic crosslinker, relative to total amount of all polymerizable components in the polymerizable composition.
36. The method of any one of embodiments 1 to 34, wherein the polymerizable composition comprises from about 10% to about 45% by weight of said at least one polysiloxane vinylic crosslinker, relative to total amount of all polymerizable components in the polymerizable composition.
37. The method of any one of embodiments 1 to 34, wherein the polymerizable composition comprises from about 10% to about 40% by weight of said at least one polysiloxane vinylic crosslinker, relative to total amount of all polymerizable components in the polymerizable composition.
38. The method of any one of embodiments 1 to 37, wherein the polymerizable composition comprises from about 0.05% to about 2.0% by weight of said at least one thermal free radical initiator, relative to the total weight of the polymerizable composition.
39. The method of any one of embodiments 1 to 37, wherein the polymerizable composition comprises from about 0.1% to about 1.75% by weight of said at least one thermal free radical initiator, relative to the total weight of the polymerizable composition.
40. The method of any one of embodiments 1 to 37, wherein the polymerizable composition comprises from about 0.15% to about 1.5% by weight of said at least one thermal free radical initiator, relative to the total weight of the polymerizable composition.
41. The method of any one of embodiments 1 to 37, wherein the polymerizable composition comprises from about 0.2% to about 1.25% by weight of said at least one thermal free radical initiator, relative to the total weight of the polymerizable composition.
42. The method of any one of embodiments 1 to 41, wherein the polymerizable composition is free of any non-reactive organic solvent.
43. A HEVL-filtering contact lens obtained according to a method of any one of embodiments 1 to 42.
44. The HEVL-filtering contact lens of embodiment 43, having: an oxygen permeability of at least about 40 barrers (preferably at least about 60 barrers, more preferably at least about 80 barrers) (at about 35 °C); an elastic modulus of about 2.0 MPa or less (preferably about 1.5 MPa or less, more preferably about 1.2 or less, even more preferably from about 0.4 MPa to about 1.0 MPa) (at a temperature of from 22 °C to 28 °C); and/or a water content of from about 15% to about 70% (preferably from about 20% to about 50% by weight) (at a temperature of from 22 °C to 28 °C) when fully hydrated.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Oxygen Permeability Measurements

Unless specified, the oxygen transmissibility (Dk/t), the intrinsic (or edge-corrected) oxygen permeability ($Dk_i$ or $Dk_c$) of a lens and a lens material are determined according to procedures described in ISO 18369-4.

Equilibrium Water Content

The equilibrium water content (EWC) of contact lenses are determined as follows.

Amount of water (expressed as percent by weight) present in a hydrated hydrogel contact lens, which is fully equilibrated in saline solution, is determined at room temperature. Quickly stack the lenses, and transfer the lens stack to the aluminum pan on the analytical balance after blotting lens in a cloth. The number of lenses for each sample pan is typically five (5). Record the pan plus hydrated weight of the lenses. Cover the pan with aluminum foil. Place pans in a laboratory oven at 100±2 °C to dry for 16-18 hours. Remove pan plus lenses from the oven and cool in a desiccator for at least 30 minutes. Remove a single pan from the desiccator, and discard the aluminum foil. Weigh the pan plus dried lens sample on an analytical balance. Repeat for all pans. The wet and dry weight of the lens samples can be calculated by subtracting the weight of the empty weigh pan.

Elastic Modulus

The elastic modulus of a contact lens is determined using a MTS insight instrument. The contact lens is first cut into a 3.12 mm wide strip using Precision Concept two stage cutter. Five thickness values are measured within 6.5 mm gauge length. The strip is mounted on the instrument grips and submerged in PBS (phosphate buffered saline) with the temperature controlled at 21±2 °C. Typically 5N Load cell is used for the test. Constant force and speed is applied to the sample until the sample breaks. Force and displacement data are collected by the TestWorks software. The elastic modulus value is calculated by the TestWorks software which is the slope or tangent of the stress vs. strain curve near zero elongation, in the elastic deformation region.

Transmittance

Contact lenses are manually placed into a specially fabricated sample holder or the like which can maintain the shape of the lens as it would be when placing onto eye. This holder is then submerged into a 1 cm path-length quartz cell containing phosphate buffered saline (PBS, pH ~7.0-7.4) as the reference. A UV/visible spectrpohotmeter, such as, Varian Cary 3E UV-Visible Spectrophotometer with a LabSphere DRA-CA-302 beam splitter or the like, can be used in this measurement. Percent transmission spectra are collected at a wavelength range of 250-800 nm with % T values collected at 0.5 nm intervals. This data is transposed onto an Excel spreadsheet and used to determine if the lenses conform to Class 1 UV absorbance. Transmittance is calculated using the following equations:

UVA % T=Average % Transmission between 315 nm and 380 nm×100

UVB % T=Average % Transmission between 280 nm and 315 nm×100

HEVL % T=Average % Transmission between 380 nm and 450 nm×100.

Chemicals

The following abbreviations are used in the following examples: NVP represents N-vinylpyrrolidone; DMA represents N,N-dimethyl acrylamide; MMA represents methyl methacrylate; EGMA represents 2-methoxyethyl methacrylate; TEGDMA represent triethyleneglycol dimethacrylate; di-Cl CuTPP represents 5,10,15,20-tetrakis(2,6-dichlorophenyl)-porphyrin-Cu(II); AIBN represents 2,2'-Azobis(2-methylpropionitrile); TAA represents tert-amyl alcohol; PBS represents a phosphate-buffered saline which has a pH of 7.2±0.2 at 25 °C and contains about 0.044 wt. % $NaH_2PO_4 \cdot H_2O$, about 0.388 wt. % $Na_2HPO_4 \cdot 2H_2O$, and about 0.79 wt. % NaCl and; wt. % represents weight percent; Norbloc is 2-[2'-hydroxy-5'-(2-methacryloxyethyl)phenyl)]-2H-benzotriazole from Aldrich; UV28 represents 2-[3'-tert-butyl-2'-hydroxy-5'-(3"-methacryloyloxypropoxy)phenyl]-5-chloro-2H-benzotriazole; CE-PDMS represents a polysiloxane vinylic crosslinker (Mw=10.1 K determined by $H^1$ NMR spectroscopy) which has three polydimethylsiloxane (PDMS) segments linked via diurethane linkages between two PDMS segments and two urethane linkages each located between one terminal methacrylate group and one PDMS segment and is prepared according to method similar to what described in Example 2 of U.S. Pat. No. 9,315,669; D9 represents mono-methacrylate polydimethylsiloxane (Mn 900-1000 g/mol); TRIS-Am represents N-[tris(trimethylsiloxy)-silylpropyl]acrylamide; Vazo-64 represents 2,2'-dimethyl-2,2'azodipropiononitrile; L-PEG 2000 represents N-(carbonyl-methoxypolyethylene glycol-2000)-1,2-disteaoyl-sn-glycero-3-phosphoethanolamin, sodium salt; DMPC represents 1,2-dimyristoyl-sn-glycero-3-phosphocholine; H-TEMPO represents 4-hydroxy-2,2,6,6-tetramethylpiperidin-1-oxyl; PrOH represents n-propanol; "H4" macromer represents a di-methacryloyloxypropyl-terminated polysiloxane (Mn ~11.3K-12.3K g/mol, OH content ~1.82-2.01 meq/g) of formula (A) shown below (A)

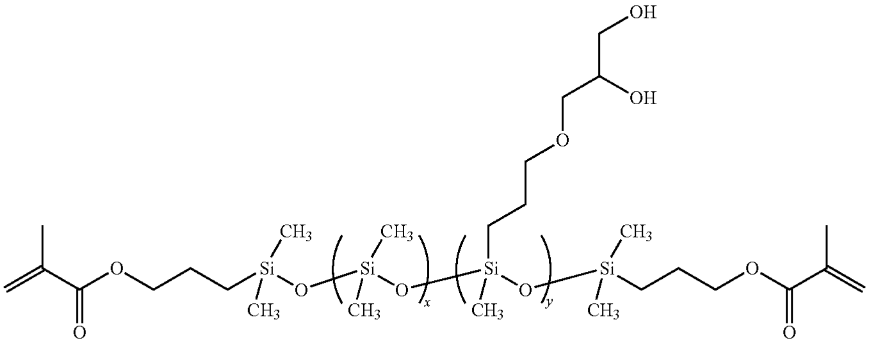

Example 2 (Comparative)

Preparation of Lens-Forming Composition Comprising DMA

A lens formulation (lens-forming composition) is prepared to have the following composition: 8.92 parts by weight of H4; 29.42 parts by weight of D9; 41.01 parts by weight of DMA; 8.92 parts by weight of MMA; 8.92 parts by weight of TAA; 0.09 parts by weight of EGMA; 0.58 parts by weight of TEGDMA; 1.34 parts by weight of Norbloc; 0.36 parts by weight of UV28; 0.07 parts by weight of di-CI CuTPP; and 0.45 part by weight of AIBN. All components are added into a clean bottle, with a stir bar to mix at 600 rpm for 30 minutes at room temperature. After all the solid is dissolved, the formulation is filtered with a glass micro filter (2.7 μm GMF filter).

Lens Fabrication

Lenses are prepared by cast-molding from a lens formulation prepared above. The lens formulation is purged with nitrogen at room temperature for 30 to 35 minutes. The $N_2$-purged lens formulation is introduced into polypropylene molds. The molds with the lens formulation therein are placed in an oven having room temperature. Then, the oven is N2-purged for 30 minutes, heated to 55 °C at a ramp rate of about 7 °C/minute and holding at 55 °C for 40 minutes and then proceeded with the thermal curing process according to a curing profile (heating from 55 °C to 80 °C at a ramp rate of about 7 °C/minute and holding at 80 °C for 40 minutes; heating from 80 °C to 100 °C at a ramp rate of about 7 °C/minute and holding at 100 °C for 40 minutes).

Lens molds each with one molded silicone hydrogel lens precursor therein are mechanically opened. The molded silicone hydrogel precursors adhere to the male mold halves.

After de-molding, cast-molded SiHy lens precursors are subjected to the following post-molding process: extracted with PrOH, three times for 60 minutes each time. At this point UV-VIS transmission spectra are recorded and are presented in FIG. 1.

It is found that no di-CI CuTPP has been incorporated into the resultant SiHy lenses (FIG. 1). Porphyrin has leached from the fabricated lens during the extraction step. This result indicates that Cu(II)-meso-aryl-substituted porphyrin is not able to copolymerize with the polymerizable components having (meth)acrylamido or (meth)acryloxy groups in a polymerizable composition free of N-vinyl amide monomer.

Example 3

Preparation of Polymerizable Compositions (with NVP Monomer)

Three polymerizable compositions are prepared to have the following composition: 8.92 parts by weight of H4; 29.42 parts by weight of D9; 41.01 parts by weight of NVP; 8.92 parts by weight of MMA; 8.92 parts by weight of TAA; 0.09 parts by weight of EGMA; 0.58 parts by weight of TEGDMA; 1.34 parts by weight of Norbloc; 0.36 parts by weight of UV28; 0.07 part by weight of di-CI CuTPP; and 0.45 part by weight of AIBN. All components are added into a clean bottle, with a stir bar to mix at 600 rpm for 30 minutes at room temperature. After all the solid is dissolved, the formulation is filtered with a glass micro filter (2.7 μm GMF filter).

Example 4

Lenses are prepared by cast-molding from a polymerizable composition prepared in Example 3. The polymerizable composition is purged with nitrogen at room temperature for 30 to 35 minutes. The N2-purged polymerizable composition is introduced into polypropylene molds and thermally cured in an oven under the following curing profile: ramp from room temperature to 55 °C at a ramp rate of about 7 °C/minute; holding at 55 °C for about 40 minutes; ramp from 55 °C to 80 °C at a ramp rate of about 7 °C/minute; holding at 80 °C for about 40 minutes; ramp from 80 °C to 100 °C at a ramp rate of about 7 °C/minute; and holding at 100 °C for about 40 minutes.

After de-molding, cast-molded SiHy contact lenses are extracted with PrOH for 180 minutes and then rinsed in PB (phosphate buffer containing about 0.077 wt. % $NaH_2PO_4 \cdot H_2O$ and about 0.31 wt. % $Na_2HPO_4 \cdot 2H_2O$) for 1 hour. The resultant silicone hydrogel contact lenses are packaged/sealed in polypropylene lens packaging shells (or blisters) (one lens per shell) with 0.65 mL of PBS, and then autoclaved (sterilized) at 121 °C for 45 minutes.

Figure 2:
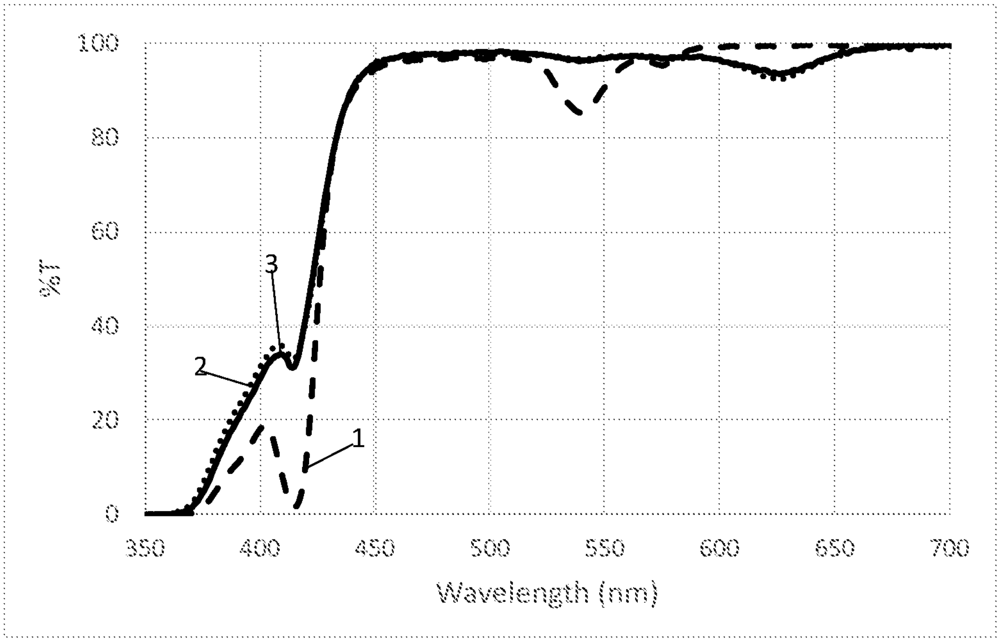

FIG. 2 shows the UV/visible transmission spectra of contact lenses prepared above from Polymerizable composition presented in Example 3 before and after the extraction of the contact lenses. As shown by FIG. 2, there is very minor difference in the UV/visible transmission spectra of the contact lenses before extraction (Curve 2-Hydrated lens) and after extraction (Curve 3-Extracted and hydrated lens). Such results indicate that a majority of di-CI CuTPP is covalently bonded (i.e., grafted) to the polymer matrix of the contact lenses and cannot be extracted out by PrOH. Decrease in intensity of Soret band (band around 420 nm) from the lens-forming composition to lens is associated with decrease in extinction coefficient in resulted chlorin, compared with original porphyrin.

Figure 3:
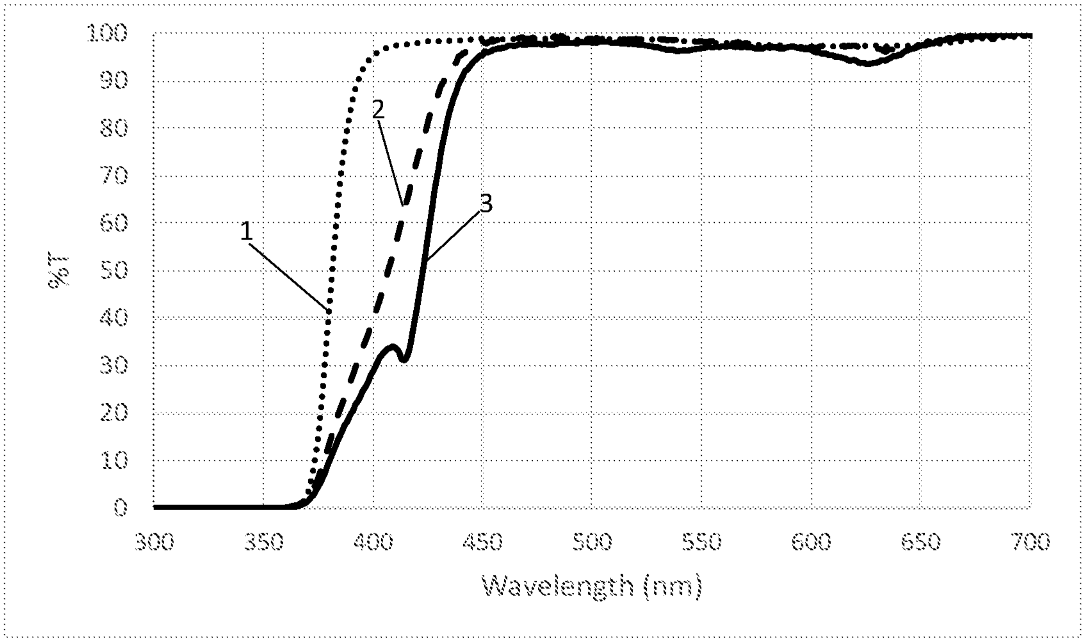
FIG. 3 shows an overlay of UV/VIS transmission spectra of: 1 (dot line)—the commercially-available Acuvue® Oasys 1-Day contact lenses from Johnson & Johnson; 2 (dash line)—the commercially-available TOTAL30® contact lenses from Alcon; and 3 (solid line)—contact lenses obtained in Example 4.

FIG. 3 shows proposed mode of incorporation of di-CI CuTPP. It is believed that porphyrin is incorporated into polymeric network of silicone hydrogel via reaction at β-pyrrole double bond in the presence of N-vinylpyrrolidone (NVP) monomer, as illustrated in the following Scheme.

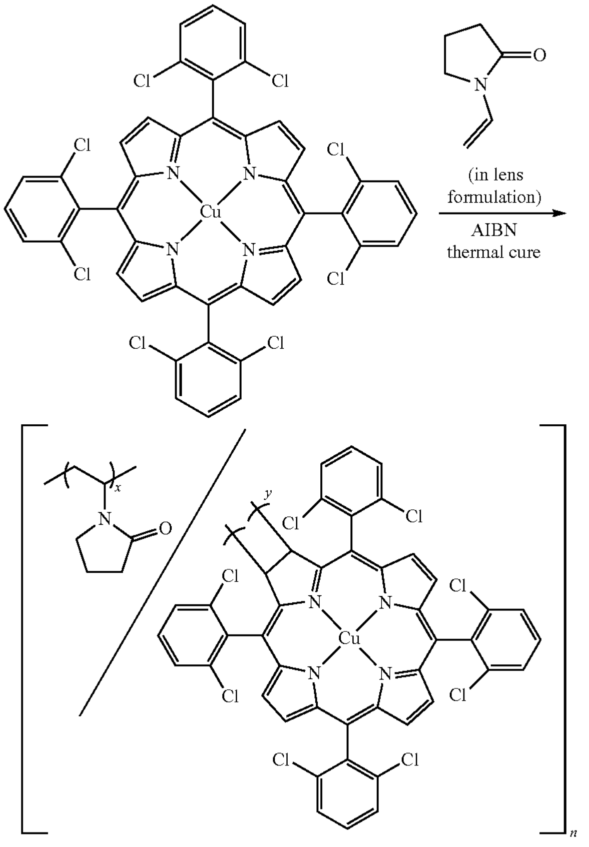

Such a mechanism can be supported by UV-VIS spectrum (FIG. 2), which shows disappearance of Q1 band at 540 nm typical for porphyrins and formation of new Q1 band at 630 nm, typical for chlorins. Additionally, incorporated porphyrin cannot be not extracted during extensive 1-PrOH extraction.

FIG. 3 shows the overlaid UV/visible transmission spectra of the commercially-available Acuvue® Oasys 1-Day contact lenses from Johnson & Johnson, the commercially-available TOTAL30® contact lenses from Alcon, and contact lens obtained above from polymerizable composition in Example 3.

Example 5

Photo-Stability Under Daylight Exposure

Contact lenses prepared in Example 4 from Polymerizable composition 3 (with 300 ppm di-CI CuTPP) are immersed in de-ionized water in a clear glass vial, and placed in a Q-sun Xenon test chamber (Model Xe-1, light intensity 18 $mW/cm^2$) to mimic sunny, summer day light.

Figure 4:
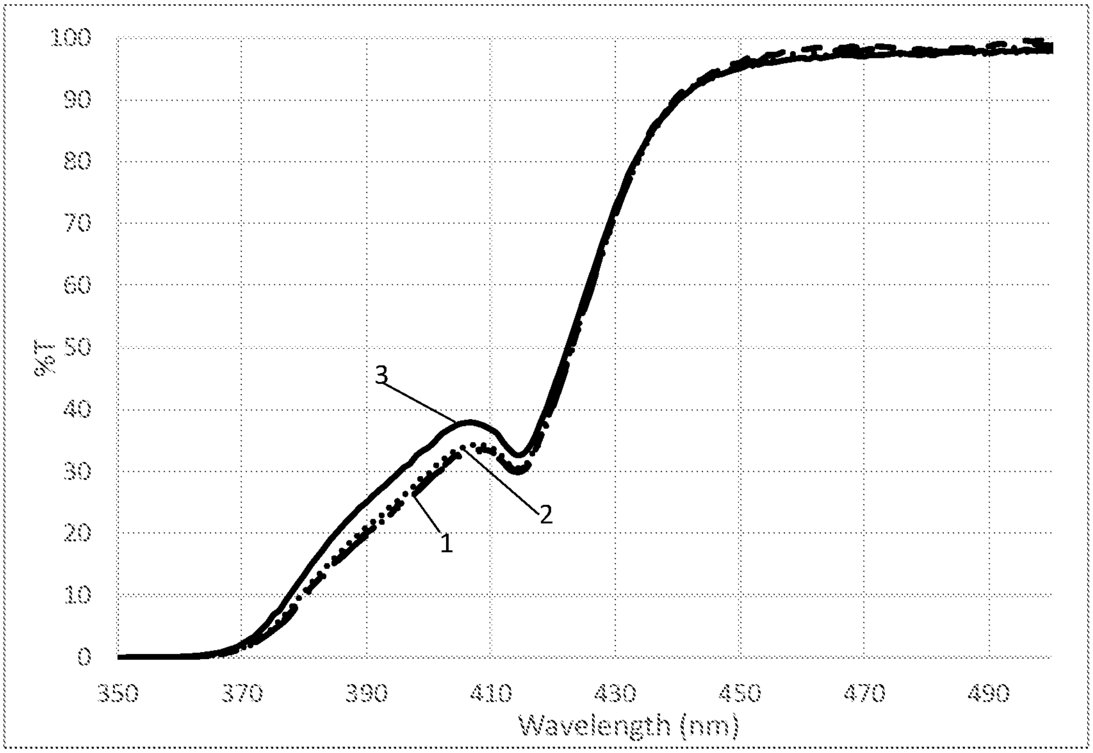
FIG. 4 shows the UV/visible transmission spectra of a HEVL-filtering contact lens of the invention as function of exposure time to mimic sunny, summer day light: 1 (dash line)—time zero; 2 (dot line)—time 7 hours; and 3 (solid line)-30 hours.

UV/visible transmission spectra of the contact lens are taken at certain time intervals. FIG. 4 displays the evolution of UV/visible transmission spectra with exposure time. The lenses show very minor change in HEVL blocking performance for up to 30 hours (equals to 30 days of normal day light). This result demonstrates that the di-Cl CuTPP containing contact lens exhibit good photo-stability over at least 1 month.

All the publications and patents which have been cited herein above are hereby incorporated by reference in their entireties.

What is claimed is:

1. A method for producing HEVL-filtering contact lenses, comprising the steps of:

(1) providing a mold for making a contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces;

(2) introducing a polymerizable composition into the cavity, wherein the polymerizable composition comprises (a) at least one Cu(II)-meso-aryl-substituted porphyrin, wherein said at least one Cu(II)-meso-aryl-substituted porphyrin is represented by formula (P1)

(P1)

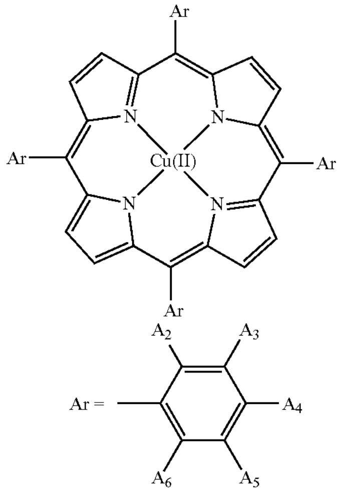

in which $A_2$ and $A_6$ independent of each other are Cl, F, $CCl_3$, $CF_3$, $CH_3$, $CH(CH_3)_2$, $C(CH_3)_3$, $OCH_3$, OH, or $NO_2$, $A_3$, $A_4$ and $A_5$ independent of one another are H, Cl, F, $CCl_3$, $CF_3$, $CH_3$, $CH(CH_3)_2$, $C(CH_3)_3$, $OCH_3$, OH, $NH_2$, or $NO_2$, (b) from about 20% to about 70% by weight of at least one hydrophilic vinylic monomer, wherein said at least one hydrophilic vinylic monomer comprises at least one hydrophilic N-vinyl amide monomer that is present in an amount in the polymerizable composition sufficient for ensuring said at least one Cu(II)-meso-aryl-substituted porphyrin to be grafted to a polymer matrix formed from the polymerizable composition, (c) at least one siloxane-containing vinylic monomer, (d) at least one polysiloxane vinylic crosslinker and/or at least one non-silicone vinylic crosslinker, (e) from 0 to about 15% by weight of at least one hydrophobic non-silicone vinylic monomer, and (f) at least one thermal free radical initiator, wherein the sum of the amounts of components (a) to (f) is at least 95% by weight relative to total amount of all polymerizable components in the polymerizable composition;

(3) curing thermally the polymerizable composition in the mold in an oven to form a lens precursor that comprises the polymer matrix having Cu(II)-meso-aryl-substituted porphyrin grafted thereto; and (4) subjecting the lens precursor to one or more post-molding processes selected from the group consisting of extraction, surface treatment, hydration, packaging, sterilization, and combinations thereof, to form a HEVL-filtering contact lens capable of filtering HEVL.

2. The method of claim 1, wherein, I formula (P1), $A_2$ and $A_6$ are Cl.

3. The method of claim 1, wherein, in formula (P1), $A_2$ and $A_6$ are $NO_2$.

4. The method of claim 1, wherein, in formula (P1), $A_2$ and $A_6$ independent of each other are Cl, F, or $NO_2$.

5. The method of claim 1, wherein, in formula (P1), $A_2$, $A_3$, $A_4$, $A_5$, and $A_6$ are identical to one other and are Cl or F.

6. The method of claim 1, wherein, in formula (P1), $A_2$ and $A_6$ independent of each other are Cl or F; $A_4$ and $A_5$ are H; and $A_3$ is Cl, F, $CCl_3$, $CF_3$, $CH_3$, $CH(CH_3)_2$, $C(CH_3)_3$, $OCH_3$, OH, $NH_2$, or $NO_2$.

7. The method of claim 1, wherein, in formula, (P1) $A_2$ and $A_6$ independent of each other are Cl or F; $A_3$ and $A_5$ are H; and $A_4$ is Cl, F, $CCl_3$, $CF_3$, $CH_3$, $CH(CH_3)_2$, $C(CH_3)_3$, $OCH_3$, OH, $NH_2$, or $NO_2$.

8. The method of claim 1, wherein said at least one Cu(II)-meso-aryl-substituted porphyrin is selected from the group consisting of 5, 10, 15,20-tetrakis(2,6-dichlorophenyl)-porphyrin-Cu(II), 5, 10, 15,20-tetrakis(2,6-difluorophenyl)-porphyrin-Cu(II), 5, 10, 15,20-tetrakis(2-chloro-6-fluorophenyl)-porphyrin-Cu(II), 5, 10, 15,20-tetrakis(2,6-dinitrophenyl)-porphyrin-Cu(II), 5, 10, 15,20-tetrakis(2,3,6-trichlorophenyl)-porphyrin-Cu(II), 5, 10, 15,20-tetrakis(2,3,6-trifluorophenyl)-porphyrin-Cu(II), 5,10,15,20-tetrakis(2,4,6-trinitrophenyl)-porphyrin-Cu(II), 5, 10, 15,20-tetrakis(2,4,6-trimethylphenyl)-porphyrin-Cu(II), 5, 10, 15,20-tetrakis(2,6-dichloro-3-aminophenyl)-porphyrin-Cu(II), 5, 10, 15,20-tetrakis(4-bromo-2,6-dichlorophenyl)-porphyrin-Cu(II), 5, 10, 15,20-tetrakis(2,6-dichloro-4-nitrophenyl)-porphyrin-Cu(II), 5, 10, 15,20-tetrakis(2,6-dichloro-3-nitrophenyl)-porphyrin-Cu(II), 5,10,15,20-tetrakis(2,6-dihydroxyphenyl)-porphyrin-Cu(II), 5, 10, 15,20-tetrakis(2,6-dimethoxyphenyl)-porphyrin-Cu(II), 5, 10, 15,20-tetrakis(pentachlorophenyl)-porphyrin-Cu(II), 5,10,15,20-tetrakis(pentafluorophenyl)-porphyrin-Cu(II), 10,15,20-tris(2,6-dichlorophenyl)-5-(2,3,4,5,6-pentafluorophenyl)-porphyrin-Cu(II), 5, 10, 15-tris (pentafluorophenyl)-20-(2.6-dichlorophenyl)-porphyrin-Cu(II), 10,20-bis(2,6-dichlorophenyl)-5,15-bis(2,3,4,5,6-pentafluorophenyl)-porphyrin-Cu(II), and combinations thereof.

9. The method of claim 1, wherein said at least one hydrophilic N-vinyl amide monomer is selected from the group consisting of N-vinylpyrrolidone, N-vinyl piperidone, N-vinyl caprolactam, N-vinyl-N-methyl acetamide, N-vinyl formamide, N-vinyl acetamide, N-vinyl isopropylamide, N-vinyl-N-methyl acetamide, N-vinyl-N-ethyl acetamide, N-vinyl-N-ethyl formamide, and mixtures thereof, wherein said at least one siloxane-containing vinylic monomer is selected from the group consisting of a vinylic monomer having a bis(trialkylsilyloxy) alkylsilyl group, a vinylic monomer having a tris(trialkylsilyloxy) silyl group, a polysiloxane vinylic monomer, 3-methacryloxy propylpentamethyldisiloxane, t-butyldimethyl-siloxyethyl vinyl carbonate, trimethylsilylethyl vinyl carbonate, and trimethylsilylmethyl vinyl carbonate, and combinations thereof.

10. The method of claim 9, wherein the polymerizable composition comprises at least one polysiloxane vinylic crosslinker which comprises at least one polysiloxane vinylic crosslinker which is selected from the group consisting of:

(1) a di-(meth)acryloyloxy-terminated polysiloxane vinylic crosslinker having dimethylsiloxane units and hydrophilized siloxane units each having one methyl substituent and one monovalent $C_4$-$C_{40}$ organic radical substituent having 2 to 6 hydroxyl groups;

(2) at least one hydrophilized polysiloxane vinylic crosslinker of formula (G)

(G)

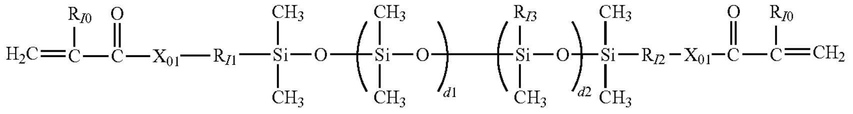

in which:

d1 is an integer of from 30 to 500 and d2 is an integer of from 1 to 75, provided that d2/d1 is from about 0.035 to about 0.15;

$X_{01}$ is O or $NR_{IN}$ in which $R_{IN}$ is hydrogen or $C_1$-$C_{10}$-alkyl;

$R_{I0}$ is hydrogen or methyl;

$R_{I1}$ and $R_{I2}$ independently of each other are a substituted or unsubstituted $C_1$-$C_{10}$ alkylene divalent radical or a divalent radical of —$R_{I4}$—O—$R_{I5}$— in which $R_{I4}$ and $R_{I5}$ independently of each other are a substituted or unsubstituted $C_1$-$C_{10}$ alkylene divalent radical;

$R_{I3}$ is a monovalent radical of any one of formula (G-1) to (G-5)

(G-1)

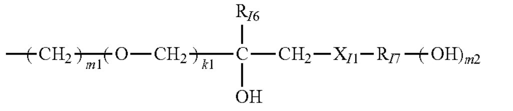

(G-2)

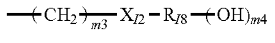

(G-3)

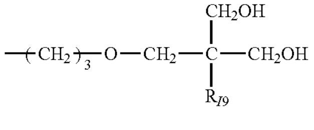

(G-4)

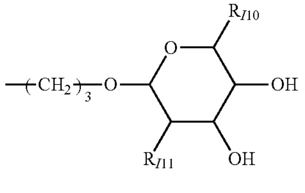

-continued (G-5)

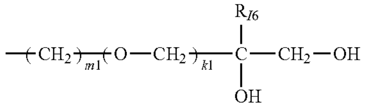

k1 is zero or 1; m1 is an integer of 2 to 4; m2 is an integer of 1 to 5; m3 is an integer of 3 to 6; m4 is an integer of 2 to 5;

$R_{I6}$ is hydrogen or methyl;

$R_{I7}$ is a $C_2$-$C_6$ hydrocarbon radical having (m2+1) valencies;

$R_{I8}$ is a $C_2$-$C_6$ hydrocarbon radical having (m4+1) valencies;

$R_{I9}$ is ethyl or hydroxymethyl;

$R_{I10}$ is methyl or hydroxymethyl;

$R_{I11}$ is hydroxyl or methoxy;

$X_{I1}$ is a sulfur linkage of —S— or a teriary amino linkage of —$NR_{I12}$— in which $R_{I12}$ is $C_1$-$C_1$ alkyl, hydroxyethyl, hydroxypropyl, or 2,3-dihydroxypropyl; and $X_{I2}$ is an amide linkage of

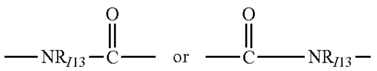

in which $R_{I13}$ is hydrogen or $C_1$-$C_{10}$ alkyl;

(3) a vinylic crosslinker which comprises one sole polydiorganosiloxane segment and two terminal ethylenically-unsaturated groups selected from the group consisting of (meth)acryloyloxy groups, (meth) acryloylamino groups, vinyl carbonate groups, vinylcarbamate groups;

(4) a chain-extended polysiloxane vinylic crosslinker which comprises at least two polydiorganosiloxane segment and a covalent linker between each pair of polydiorganosiloxane segments and two two terminal ethylenically-unsaturated groups selected from the group consisting of (meth)acryloyloxy groups, (meth) acryloylamino groups, vinyl carbonate groups, vinylcarbamate groups;

(5) a polysiloxane vinylic crosslinker selected from the group consisting of α, ω-bis[3-(meth)acrylamidopropyl]-terminated polydimethylsiloxane, α, ω-bis[3-(meth)acryloxy-propyl]-terminated polydimethylsiloxane, α, ω-bis[3-(meth)acryloxy-2-hydroxypropyloxy-propyl]-terminated polydimethylsiloxane, α, ω-bis[3-(meth)acryloxy-ethoxy-2-hydroxy-propyloxypropyl]-terminated polydimethylsiloxane, α, ω-bis[3-(meth)acryloxypropyloxy-2-hydroxypropyloxypropyl]-terminated polydimethylsiloxane, α, ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α, ω-bis[3-(meth)acrylamidopropyloxy-2-hydroxypropyloxy-propyl]-terminated polydimethylsiloxane, α, ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α, ω-bis[3-(meth)acryloxyethylamino-2-hydroxypropyloxypropyl]-terminated polydimethylsiloxane, α,ω-bis[3-(meth)acryloxypropylamino-2-hydroxypropyloxy-propyl]-terminated polydimethylsiloxane, α, ω-bis[3-(meth)acryloxybutylamino-2-hydroxypropyloxypropyl]-terminated polydimethylsiloxane, α, ω-bis[(meth)acrylamido-ethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α, ω-bis[3-(meth)acrylamide-butylamino-2-hydroxypropyloxy-propyl]-terminated polydimethylsiloxane, α,ω-bis[(meth) acryloxy-2-hydroxypropyloxy-ethoxypropyl]-terminated polydimethylsiloxane, α,ω-bis[(meth) acryloxy-2-hydroxy-propyl-N-ethylaminopropyl]-terminated polydimethylsiloxane, α, ω-bis[(meth) acryloxy-2-hydroxypropyl-aminopropyl]-polydimethylsiloxane, α,ω-bis[(meth)acryloxy-2-hydroxy-propyloxy-(polyethylenoxy) propyl]-terminated polydimethylsiloxane, α, ω-bis[(meth)acryloxyethylamino-carbonyloxy-ethoxypropyl]-terminated polydimethylsiloxane, α, ω-bis[(meth)acryloxyethylamino-carbonyloxy-(polyethylenoxy) propyl]-terminated polydimethylsiloxane, and combinations thereof; and (6) combinations thereof.

11. The method of claim 10, wherein the polymerizable composition comprises: at least one non-silicone vinylic crosslinker; at least one hydrophobic non-silicone vinylic monomer; at least one UV-absorbing vinylic monomer; at least one UV/HEVL-absorbing vinylic monomer; at least one photochromic vinylic monomer; a polymerizable dye; or combinations thereof.

12. The method of claim 10, wherein the polymerizable composition comprises from about 5% to about 50% by weight of said at least one siloxane-containing vinylic monomer, from about 10% to about 45% by weight of said at least one polysiloxane vinylic crosslinker, and from about 0.05% to about 2.0% by weight of said at least one thermal free radical initiator, relative to the total weight of the polymerizable composition.

13. The method of claim 12, wherein the polymerizable composition is free of any non-reactive organic solvent.

* * * * *